United States Patent

Ogasawara et al.

[11] Patent Number: 6,049,516
[45] Date of Patent: *Apr. 11, 2000

[54] INFORMATION RECORDING AND/OR REPRODUCING METHOD AND APPARATUS IN WHICH A SERVO PROCESS OF A LIGHT BEAM IS INTERRUPTED BETWEEN INPUT/OUTPUT CONTROL OF DATA AT PREDETERMINED PERIODS

[75] Inventors: Yutaka Ogasawara, Yokohama; Hirotake Ando, Tokyo; Akira Miyashita, Tokorozawa; Nobuyuki Tonegawa, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/039,264

[22] Filed: Mar. 16, 1998

Related U.S. Application Data

[62] Division of application No. 08/357,291, Dec. 13, 1994, Pat. No. 5,825,729.

[30] Foreign Application Priority Data

Dec. 15, 1993 [JP] Japan ................................. 5-315173
Dec. 28, 1993 [JP] Japan ................................. 5-337496
Sep. 12, 1994 [JP] Japan ................................. 6-217408

[51] Int. Cl.$^7$ .................................................. G11B 7/00
[52] U.S. Cl. .............................................. 369/54; 369/116
[58] Field of Search ................................ 369/54, 116, 32, 369/47, 44.34, 44.31, 44.29

[56] References Cited

U.S. PATENT DOCUMENTS

| | | | |
|---|---|---|---|
| 4,651,314 | 3/1987 | Yoshikawa, et al. | 369/45 |
| 5,077,719 | 12/1991 | Yanagi, et al. | 369/44.13 |
| 5,079,755 | 1/1992 | Hangai, et al. | 369/44.11 |
| 5,107,101 | 4/1992 | Ando | 250/201.5 |
| 5,195,067 | 3/1993 | Yanagi | 369/32 |
| 5,235,582 | 8/1993 | Taniguchi, et al. | 369/44.26 |
| 5,428,590 | 6/1995 | Ogino | 369/44.28 |
| 5,436,877 | 7/1995 | Ohshima | 369/44.35 |
| 5,491,677 | 2/1996 | Sasaki | 369/44.36 |
| 5,502,695 | 3/1996 | Miura et al. | 369/47 |
| 5,570,330 | 10/1996 | Okawa | 369/54 |

*Primary Examiner*—Thang V. Tran
*Attorney, Agent, or Firm*—Fitzpatrick, Cella, Harper & Scinto

[57] ABSTRACT

An information recording and/or reproducing method and apparatus for effecting recording of data onto and/or reproducing of data from a recording medium by irradiating a desired track on the recording medium with a light beam emitted from a light source through an optical system. In the apparatus, a single processor executes an input/output control of the data for the apparatus and a power control of the light beam by interrupting the input/output control at every predetermined period. The processor inhibits the interrupt power control of the light beam in accordance with a predetermined situation.

2 Claims, 16 Drawing Sheets

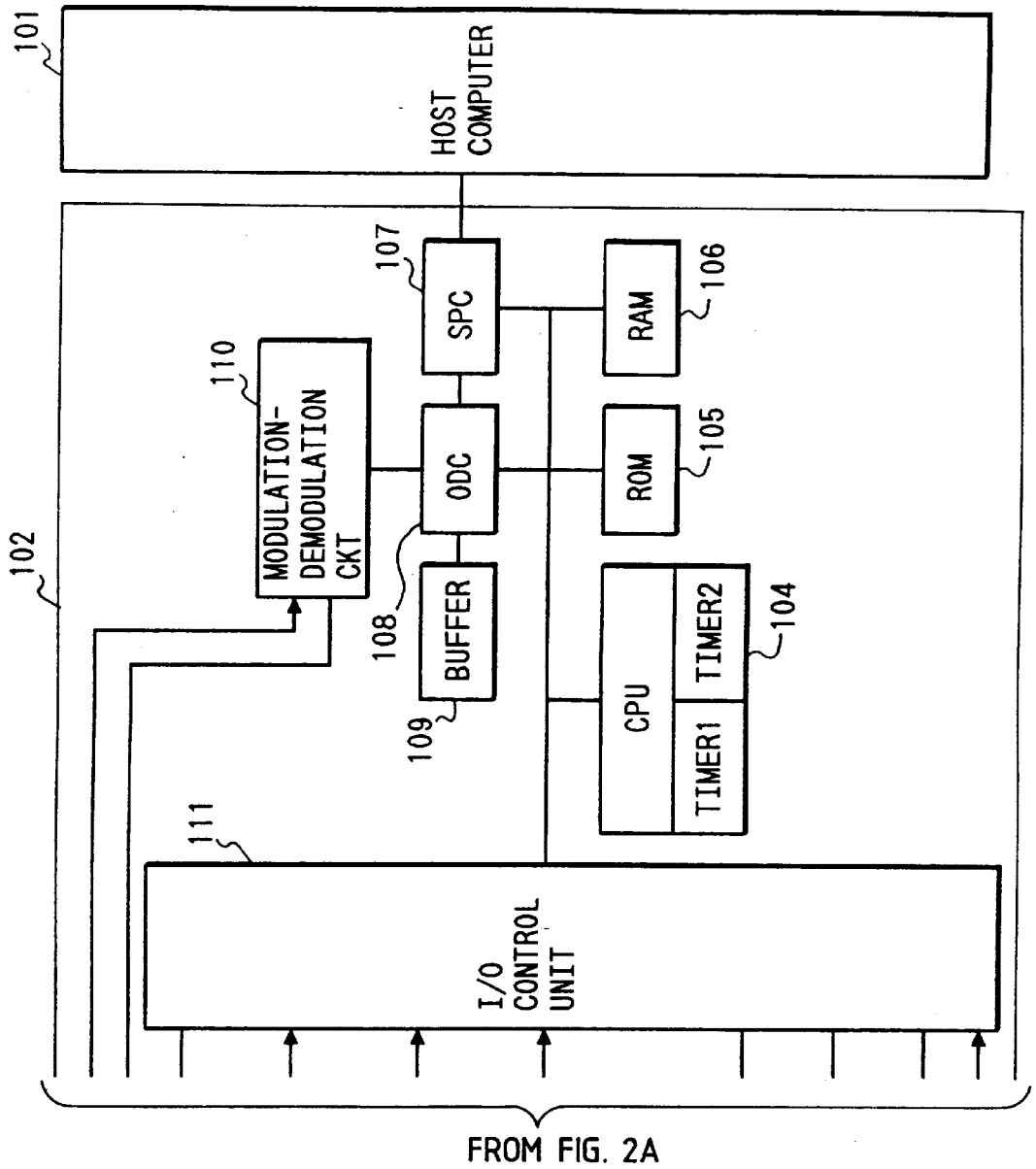

INFORMATION RECORDING AND/OR REPRODUCING METHOD AND APPARATUS IN WHICH A SERVO PROCESS OF A LIGHT BEAM IS INTERRUPTED BETWEEN INPUT/ OUTPUT CONTROL OF DATA AT PREDETERMINED PERIODS

This application is a divisional of copending application Ser. No. 08/357,291, filed Dec. 13, 1994 now U.S. Pat. No. 5,825,729.

BACKGROUND OF THE INVENTION

1. Field of the Invention

The present invention relates to an information recording and/or reproducing apparatus having a processor and its method for recording and/or reproducing information to/from a magnetic disk, a magnetooptic disk, or the like in response to a command of a computer by connecting the apparatus to a computer.

2. Related Background Art

Hitherto, as a secondary memory apparatus of a host computer, a magnetic disk apparatus, a magnetooptic disk apparatus, or the like is used. The host computer and the secondary memory apparatus are connected by an interface such as an SCSI (Small Computer System Interface) or the like. In such an interface, generally, a read command, a write command, or the like is generated from the host computer to the apparatus and the host computer can recognize the end of execution of the command by a notification from the apparatus.

The operation of the apparatus side will now be described as an example with respect to a magnetooptic disk apparatus of 3.5 inches connected to the host computer by the SCSI. It is assumed that the magnetooptic disk apparatus uses a disk according to the international standard ISO 10090.

FIG. 1 shows the operation of the magnetooptic disk apparatus when a read/write command is received from the host computer. First, when a CPU, which is provided in the magnetooptic disk apparatus and executes a command process receives a command, the CPU analyzes the command in step S1. In this instance, the CPU discriminates the kind (read, write, etc.) of command, disk position, data size, and the like. On the basis of the result of the discrimination, an address on the disk to be read or written is calculated. The disk position designated by an SCSI command by the host computer is a logical position and its address is expressed by a serial number. On the other hand, the disk address specified by the ISO 10090 is a physical address and is expressed by a track number and a sector number. A defective sector and an alternate sector to relieve the defect are provided in the disk. Alternation management information to manage those sectors and the like have also previously been recorded on the disk. When converting from the logical address designated by the SCSI to the physical address of the disk, it is necessary to also check the presence or absence of the defective sector or the like. When the physical address of the disk is determined, a recording and reproducing head is moved to the physical address (such an operation is called a seek) in step S3. The reading or writing operation is executed for the disk in step S4. After the reading/writing operation is executed, the execution result is sent as a status to the host computer in step S5. In this way, one command process is finished.

In the magnetooptic disk apparatus, not only is the above execution of the command process stationarily performed, but also the controls of various drives are stationarily executed. For example, there are executed: a speed control of a spindle motor to rotate the disk; and output control of a laser beam for recording and reproducing; tracking/ focusing servo controls for positioning the recording/ reproducing head; and the like. Those various kinds of drive controls are digitally processed by a high speed CPU from a viewpoint of the superiority of the costs, performance, and the like. A construction such that the CPU executes the command process and the CPU controls various drives in order to reduce the costs has also been proposed. In this case, since it is necessary to always perform the control during the driving operation, for example, the driving process is interrupted and the command process is performed at a predetermined interval.

The recent improvement of the performance of the computer is remarkable and an increase in processing speed of a secondary memory apparatus of the computer is also demanded in association with it. Namely, it is demanded to reduce the command executing time. The command executing time includes not only an actual operation (seeking operation of the head, recording and reproducing operations of data, and the like) time for the actual reading/writing operations and the like of the drive but also a command pre-processing time which is required for the drive to analyze the command from the host computer (step S1 in FIG. 1) and to calculate the target address (S2 in FIG. 1) and a command post-processing time which is required to notify the result of the operation to the host computer (S5 in FIG. 1) after completion of the actual occupation such as reading, writing, or the like. In order to reduce the command executing time, not only is a decrease in actual operating time of the drive demanded, but also a decrease in command pre-processing and command post-processing time are demanded.

SUMMARY OF THE INVENTION

It is an object of the invention to reduce a command executing time in an information recording and/or reproducing apparatus in which a CPU to execute a command process and a CPU to control various drives are commonly used.

According to the invention, the above object is accomplished by an information recording and/or reproducing apparatus for recording data on and/or reproducing data from a recording medium by irradiating a desired track of the recording medium with a light beam emitted from a light source through an optical system, wherein the apparatus includes a single processor for executing an input/output control of the data for the apparatus and a servo control of the light beam by interruption during the input/output control at every predetermined period, and wherein the processor switches a precision of the servo control in accordance with a situation.

The above object is also accomplished by an information recording and/or reproducing method for recording and/or reproducing data onto/from a recording medium by irradiating a desired track of the recording medium with a light beam emitted from a light source through an optical system, wherein the method includes a step of executing an input/ output control of the data, a step of executing a servo control of the light beam by interruption during the input/output at every predetermined period and a step of switching a precision of the servo control in accordance with a situation.

Further, the above object is also accomplished by an information recording and/or reproducing apparatus for effecting recording of data on and/or reproduction of data from a recording medium by irradiating a desired track on the recording medium rotated by a spindle motor with a light beam emitted from a light source through an optical system, wherein the apparatus includes a single processor for executing an input/output control of data for the apparatus and a velocity control of the spindle motor by interruption during the input/output control at every predetermined period, and the single processor inhibits the interrupt velocity control in accordance with a situation.

Further, the above object is also accomplished by an information recording and/or reproducing method for effecting recording of data on and/or reproduction of data from a recording medium by irradiating a desired track on the recording medium rotated by a spindle motor with a light beam emitted from a light source through an optical system, wherein the method includes a step of executing an input/output control of data, a step of executing a velocity control of the spindle motor by interruption during the input/output control at every predetermined period, and a step of inhibiting the interrupt velocity control in accordance with a situation.

Further, the above object is also accomplished by an information recording and/or reproducing apparatus for effecting recording of data on and/or reproduction of data from a recording medium by irradiating a desired track on the recording medium with a light beam emitted from a light source through an optical system, wherein the apparatus includes a single processor for executing an input/output control of data for the apparatus and a power control of the light beam by interruption during the input/output control at every predetermined period, and the processor inhibits the interrupt power control of the light beam in accordance with a situation.

Further, the above object is also accomplished by an information recording and/or reproducing method for effecting recording of data on and/or reproduction of data from a recording medium by irradiating a desired track on the recording medium with a light beam emitted from a light source through an optical system, wherein the method includes a step of executing an input/output control of data, and a step of executing a power control of the light beam by interruption during the input/output control at every predetermined period, and a step of inhibiting the interrupt power control of the light beam in accordance with a situation.

The above and other objects and features of the present invention will become apparent from the following detailed description with reference to the accompanying drawings.

DETAILED DESCRIPTION OF THE PREFERRED EMBODIMENTS

First Embodiment

Figure 1:
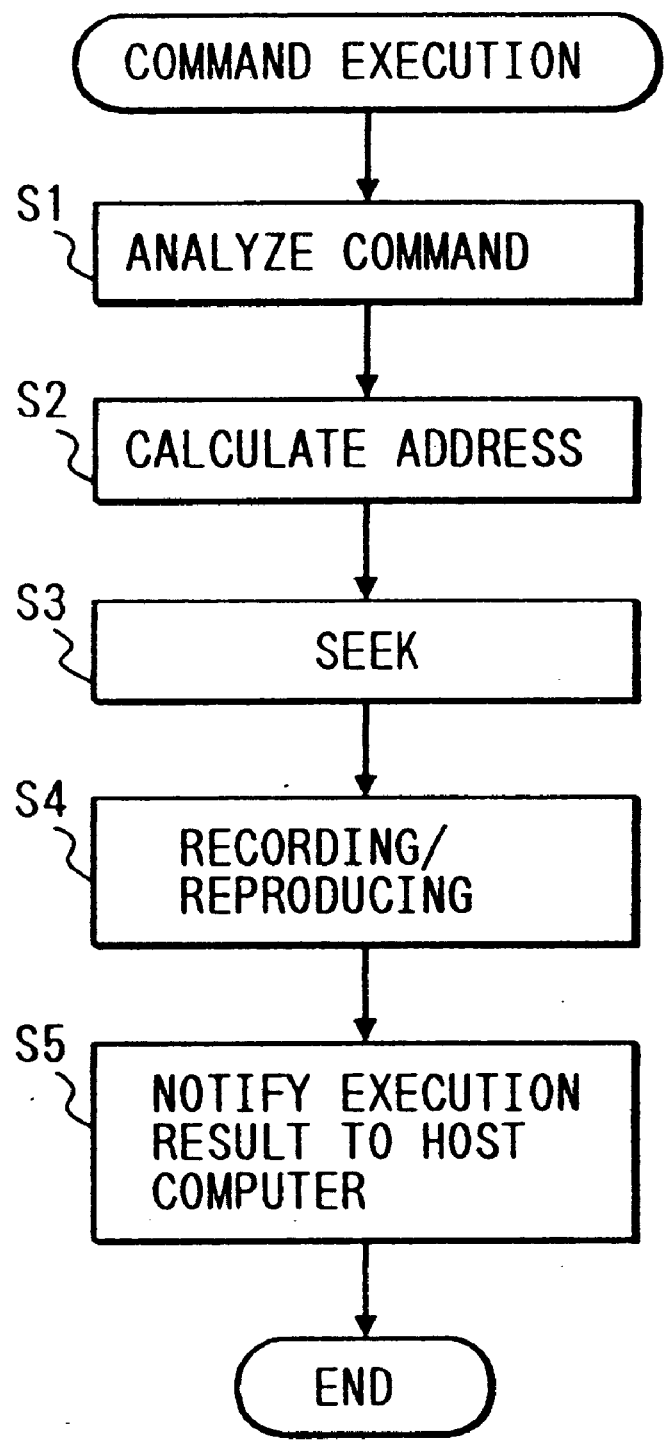
FIG. 1 is a block diagram showing the operation of a conventional information recording and/or reproducing apparatus.
Figure 2A:
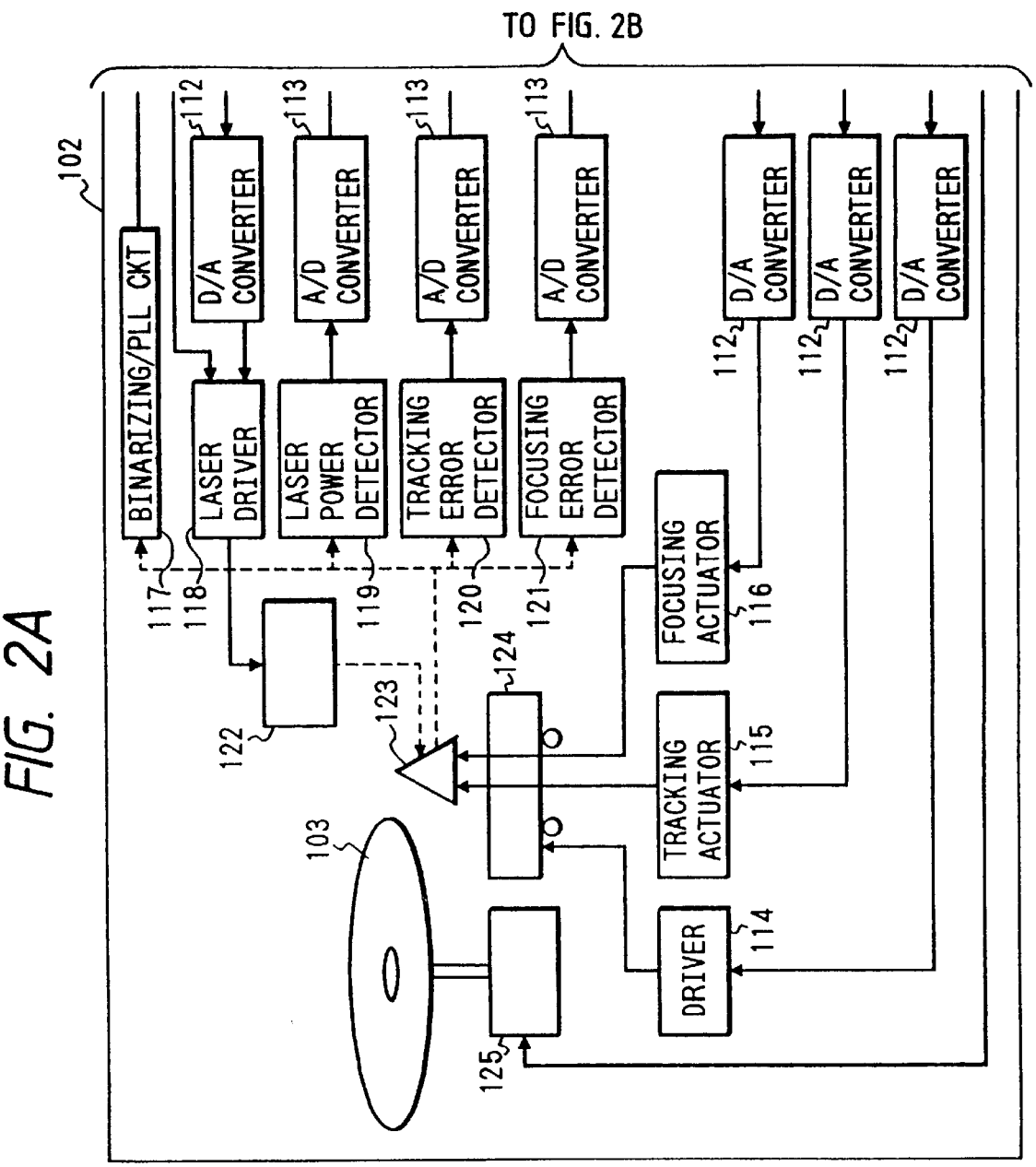
FIG. 2 is comprised of FIGS. 2A and 2B illustrating block diagrams showing the first embodiment of an information recording and/or reproducing apparatus of the invention.

A first embodiment of the present invention will now be described in detail hereinbelow with reference to the drawings. FIGS. 2A and 2B are block diagrams showing an embodiment of an information recording and/or reproducing apparatus of the invention. In FIGS. 2A and 2B, reference numeral 101 denotes a host computer and 102 indicates a magnetooptic disk apparatus. The host computer 101 and the magnetooptic disk apparatus are connected by an SCSI (Small Computer System Interface). Reference numeral 103 denotes a magnetooptic disk and 104 indicates a CPU to control the apparatus. The CPU 104 has timers 1 and 2 therein. As a CPU in the information recording and reproducing apparatus of the invention, only one CPU is provided. Reference numeral 105 denotes a ROM to store a program; 106 a work RAM of the CPU 104; 107 an SPC (SCSI Protocol Controller) to control the SCSI; 108 an ODC (Optical Disk Controller) to perform the data control of the magnetooptic disk; 109 a buffer to store read/write data; 110 a modulation-demodulation circuit for modulating/demodulating the data of the host computer to the pit pattern of the disk; and 111 an I/O control unit having a plurality of input/output ports.

Reference numeral 125 denotes a spindle motor to rotate the magnetooptic disk 103 by the control of the CPU 104. Reference numeral 122 denotes a semiconductor laser and 123 indicates an optical system to irradiate or focus a laser beam emitted from the semiconductor laser 122 onto the disk surface. An output signal of a photosensor (not shown) in the optical system 123 is supplied to a binarization/PLL circuit 117, a laser power detector 119, a tracking error detector 120, and a focusing error detector 121 and is converted into a digital signal by each A/D converter 113, respectively. The digital signal is transmitted to the I/O control unit 111, so that the CPU 104 can know the value of each digital signal. Reference numeral 118 denotes a laser driver to drive the semiconductor laser 122; 115 a tracking actuator to perform a tracking operation of the optical system 123; and 116 a focusing actuator to perform a focusing operation of the optical system 123. The CPU 104 controls the driver and actuators through D/A converters 112. A linear motor 124 is provided to move the optical system 123 to a desired position (in the radial direction). The CPU 104 controls the linear motor 124 by driving a driver 114 through the D/A converter 112.

Figure 2:
Figure 4:
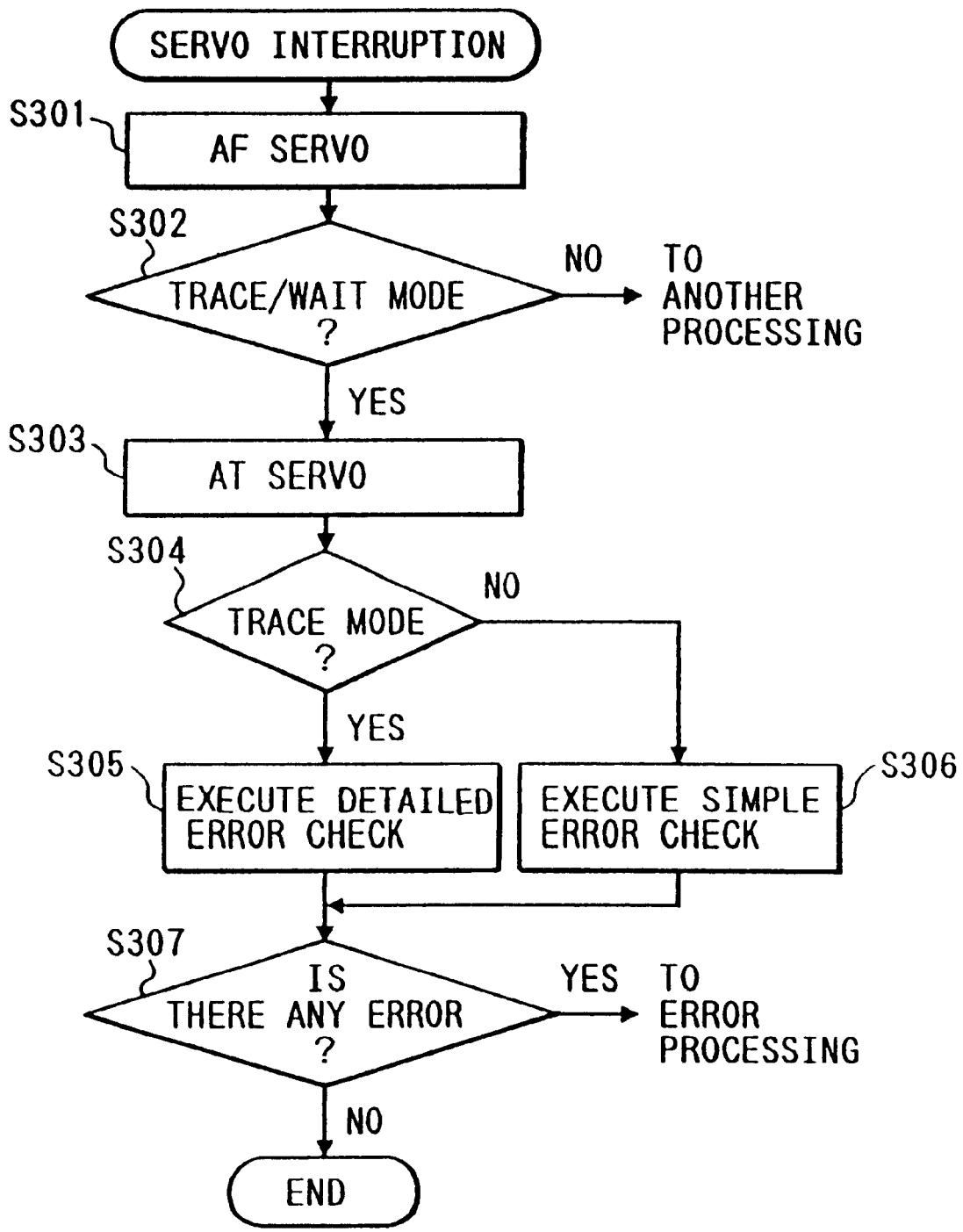
FIG. 4 is a flowchart showing a servo interrupting process of the embodiment.

Servo processes for auto focusing (hereinafter, simply referred to as AF) and auto tracking (hereinafter, simply referred to as AT) of a laser beam which is irradiated from the optical system 123 to the magnetooptic disk 103 will now be described with reference to FIGS. 2 and 4. The CPU 104 extracts a tracking error signal from the tracking error detector 120 and a focusing error signal from the focusing error detector 121 through the A/D converters 113. The CPU 104 obtains control amounts of the tracking actuator 115 and focusing actuator 116 so as to control the optical system 123 to a desired position and sets the control values to the D/A converters 112. The CPU 104 also executes error checks of the AT and AF by the tracking error signal and focusing error signal. In order to execute the servo processes at a sampling frequency of 50 kHz, an interruption of every 20 $\mu$sec is generated by the timer 1 in the CPU 104 and the servo processes are executed in the interrupting process. The interrupting process has the highest priority and the other process (command process) is interrupted during the execution of the interrupting process. As servo states, there are a wait mode in which the laser beam is held on the same track, a trace mode in which the spiral track is traced, a seek mode in which the recording/reproducing head is moved to another track, and the like. The servo state is set to the trace mode upon recording or reproducing and is set to the wait mode upon waiting for the recording/reproducing operation. FIG. 4 shows a flow for the servo interrupting process. When the interruption occurs, first in step S301, the focusing error signal is extracted from the focusing error detector 121, a cubic filter calculation is executed, and the result of the arithmetic operation is set into the focusing actuator 116. In step S302, the servo mode in the work RAM 106 is discriminated and when the servo mode is the trace mode or wait mode, step S303 follows. In step S303, the tracking error signal is extracted from the tracking error detector 120, a cubic filter calculation is executed, and the result of the arithmetic operation is set into the tracking actuator 115. In step S304, the servo mode in the work RAM 106 is discriminated and when the servo mode is the trace mode, step S305 follows. When it is the wait mode, step S306 follows. In step S305, a detailed error check of the focusing error signal and tracking error signal is executed. In step S306, a simple check is performed. There is a difference between the detailed check in step S305 and the simple check in step S306 with respect to the following point. Namely, although the processing time is long, the precision is high in the detailed check. Although the precision is coarse, the processing time is short in the simple check. When there is an error as a result of the check, the processing routine advances to an error process in step S307. When there is no error, the interrupting process is finished. The CPU control is returned to the command process before interruption. An example of the detailed check and simple check will be described later.

Figure 5:
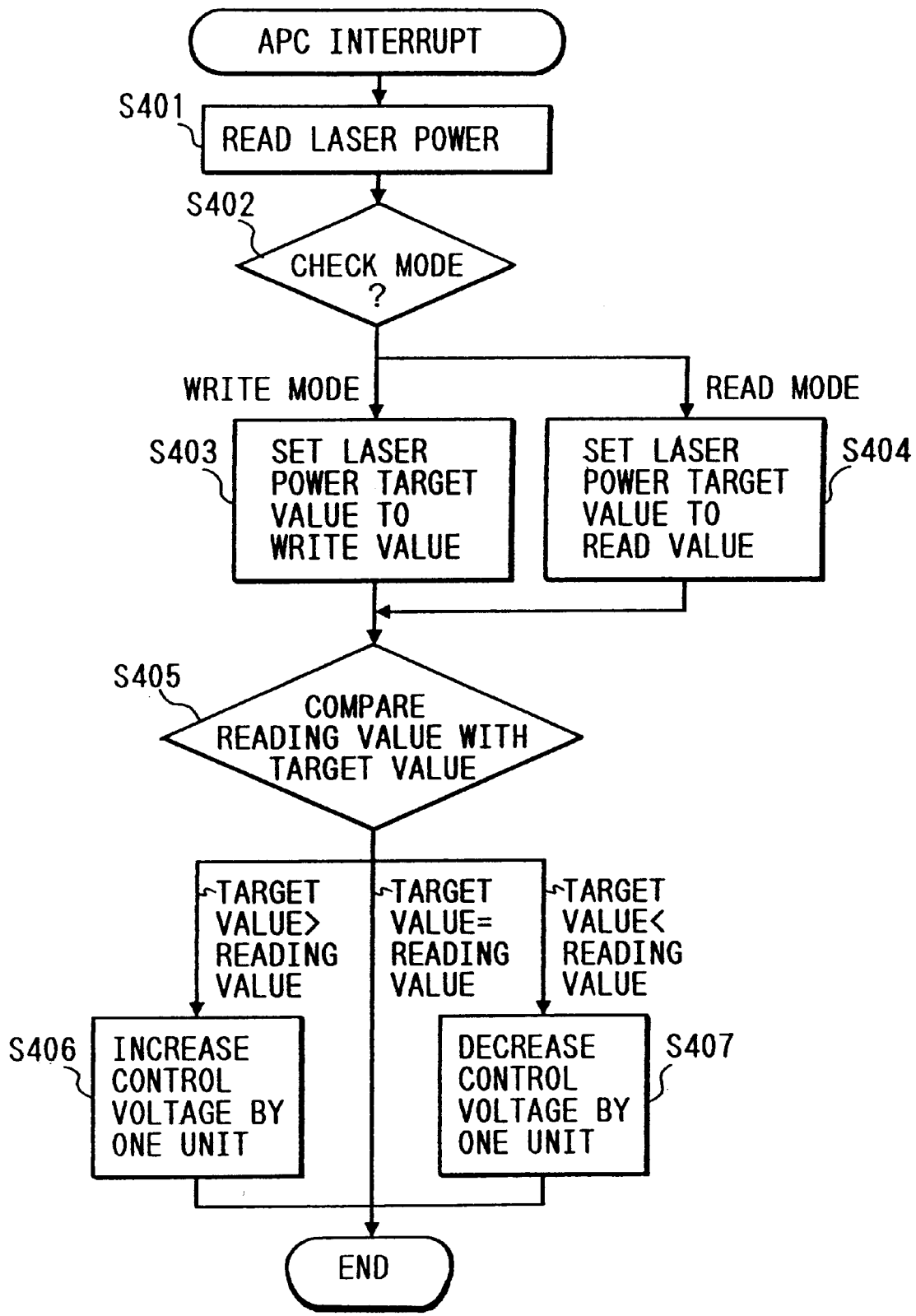
FIG. 5 is a flowchart showing a laser APC interrupting process of the embodiment.

An automatic adjusting process of the laser power (hereinafter, simply referred to as APC) will now be described with reference to FIGS. 2 and 5. A power of a laser beam which is emitted from the semiconductor laser 122 is not constant due to a temperature change, deterioration, or the like of the laser beam even if a control voltage which is supplied from the laser driver 118 is constant. Therefore, in order to control the laser power to a predetermined power, a part of the emission light of the semiconductor laser is monitored by the laser power detector 119 and the control voltage to the laser driver 118 is increased or decreased so as to have a predetermined value. An interruption of every 1 msec is generated by the timer 2 in the CPU 104 so as to execute the above processes at a sampling frequency of 1 kHz that is sufficiently high to correct the power fluctuation due to the temperature change or deterioration of the laser beam. The above process is executed in the interrupting process. FIG. 5 shows the interrupting process. When the interruption occurs, first in step S401, the value corresponding to the laser power is read from the laser power detector 119. In step S402, the present mode is checked. When it is the write mode, a target value of the laser power in the work RAM 106 is set to the write value in step S403. When the present mode is the read mode, the laser power target value is set to the reading value in step S404. In step S405, the set laser power target value is compared with the read laser power corresponding value. When the target value is larger than the reading value, the control voltage to the laser driver 118 is increased by one unit in step S406. When the target value is smaller than the reading value, the control voltage to the laser driver 118 is decreased by one unit in step S407. When the target value is equal to the reading value, nothing is performed and the interrupting process is finished. The CPU control is returned to the process before the interruption.

An executing process when the CPU 104 receives the read/write (input/output of the data) command from the host computer will now be described with reference to FIGS. 2 and 3. First in step S201, the servo mode in the work RAM 106 is set into the wait mode, thereby permitting the APC interruption. In this instance, another interruption also can be permitted. In step S202, the SPC 107 is checked and the apparatus waits until an SCSI command is sent from the host computer 101. When the SCSI command comes, the APC interruption is inhibited in step S203. The SCSI command is inputted from the SPC 107 and the command is analyzed in step S204. When the command is the read/write command, the logical address (serial number) designated by the SCSI command is converted to the physical address (comprising a track number and a sector number) of the disk. The distance from the present position to the target physical address is calculated. (The processes until this stage relate to a command pre-process.) In step S206, the APC interruption is permitted. In step S207, after the servo mode in the work RAM 106 is set from the wait mode to the seek mode, the linear motor 124 is driven, thereby executing the seeking operation to the target address. After completion of the seeking operation, in step S208, the servo mode in the work RAM 106 is set to the trace mode. In step S209, the reading/writing process is executed. In the case of reading, the reproduction signal from the optical system 123 is digitized by the binarization/PLL circuit 117 and the ODC 108 extracts the data of the target sector from the data demodulated by the modulation-demodulation circuit 110 and stores this data into the buffer 109. The SPC 107 transfers the read data from the buffer 109 to the host computer 101 through the ODC 108. In the case of writing, the SPC 107 stores the write data transferred from the host computer 101 into the buffer 109 through the ODC 108. The ODC 108 sends the write data of the buffer 109 to the modulation-demodulation circuit 110 at the target sector. The signal modulated by the modulation-demodulation circuit 110 is outputted to the laser driver 118 and the semiconductor laser 122 is set to a write power and irradiates the laser beam of the write power to the disk. In the case of writing, a bias magnet (not shown) is driven, thereby applying a magnetic field to the disk. (The processes so far relate to a command executing process and processes after that relate to a command post-process.) After the reading/writing operation was executed, the servo mode in the work RAM 106 is set to the wait mode and the APC interruption is inhibited in step S210. In step S211, the read/write execution result is notified as a status to the host computer 101 through the SPC 107. The above processes are repeated from step S201 in order to execute the next command process. In the case when the command from the host computer is a command like one to inquire as to the kind of disk and is not accompanied with the recording or reproduction, after completion of the command analysis in step S204, the APC interruption is held in the inhibited state and the processing routine directly advances to step S211.

Although the APC is not obviously executed during the APC interruption inhibition, such a process is permitted on the basis of a philosophy, which will be explained hereinafter. First, when the emission of the laser beam is being executed for the purpose of recording information on and/or reproducing information from the disk, a considerably high precision of the laser power is needed. However, for example, in the wait mode other than such a case, it is sufficient to control the laser power to a level such as not to cause any damage to the information recorded on the disk without causing any difficulty in the servo operation. Therefore, the precision which is required is lower than that upon recording or reproduction. That is, the sampling frequency can be decreased and the APC can be stopped for a short time. Similarly, as for the servo process, in the waiting state in which the recording and reproduction are not executed, even if the checking precision of the servo error is set to a value lower than that upon recording/reproduction, no problem occurs.

In the above embodiment, the error check in the servo interrupting process has been set to the simple check (S306 in FIG. 4) in the servo waiting state. However, the sampling period of the servo process also can be changed instead of changing the contents of the error check. For example, in FIG. 3, by setting the sampling period to 40 kHz in steps S201 and S210 and to 50 kHz in step S206, the sampling period is dropped in the servo waiting state and the number of servo interrupting times is reduced, so that the servo processing time during the command pre-process and post-process can be reduced.

As another embodiment, in the servo waiting state, the arithmetic operating processes in the AF servo (S301 in FIG. 4) and AT servo (S303 in FIG. 4) of the servo interrupting process also can be simplified. For example, although the cubic filter (corresponding to an arithmetic operating equation to calculate the control amount) has been used in each of the AF servo (S301) and AT servo (S303) in FIG. 4, the servo processing time also can be reduced by using a quadratic filter during the command pre-process/post-process. The simplification of the arithmetic operation will be described in detail hereinafter.

In the foregoing embodiment, the simple servo control has been performed in the servo waiting state and the precise servo control has been executed in the servo tracking state. However, as another embodiment, the precise servo control also can be executed even in the command waiting state (loop in step S202 in FIG. 3) although the apparatus is in the servo waiting state. For this purpose, a detailed check flag indicative of the servo error check level is newly provided in the work RAM 106. In the servo interrupting process S304 in FIG. 4, the processing routine is changed in a manner such that when the detailed check flag has been set to ON, the detailed error check is executed in step S305 and, when the detailed check flag has been set to OFF, the simple error check is performed in step S306. In the command executing process in FIG. 3, the detailed check flag in the work RAM 106 is turned ON in steps S201 and S208 and the detailed check flag in the work RAM 106 is turned OFF in steps S203 and S210. Thus, since the precise servo control is performed even in the command waiting state, the head can be held at the accurate disk position.

Figure 3:
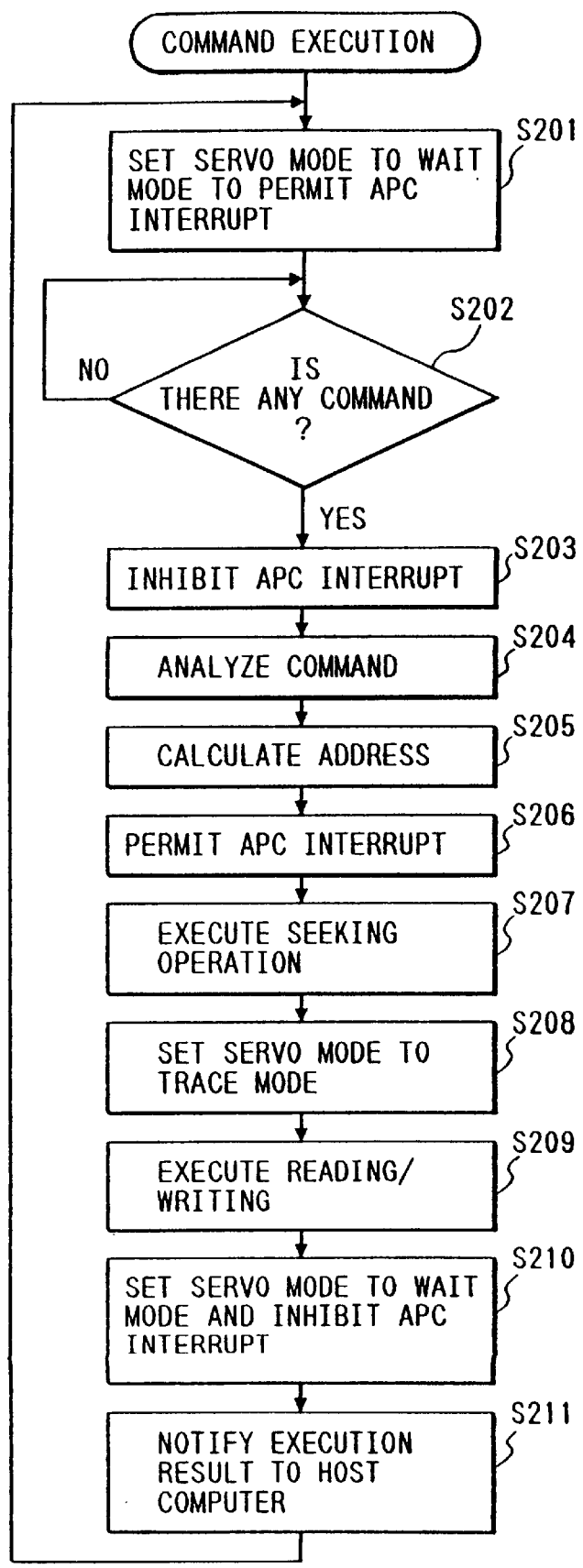
FIG. 3 is a flowchart showing a command executing process of the embodiment.

In the embodiment, the APC process has been inhibited at the time of the command pre-process (S204 and S205 in FIG. 3) and the command post-process (S211 in FIG. 3). However, instead of the inhibition, it is also possible to operate in a manner such that the sampling period is dropped similarly as in the case of the servo process or an arithmetic operation of a set value which is set into the laser driver 118 is simplified so as to have a predetermined laser power by a laser power signal from the laser power detector 119 or the APC process is reduced as another means. On the contrary, in the ordinary APC process, an advanced process also can be executed so as to increase or decrease the control voltage by an amount corresponding to a difference between the laser power corresponding value and the target value instead of merely increasing or decreasing the control voltage by one unit.

Further, in the above embodiment, although the AT/AF servo process and the APC processing method have been changed with respect to the command pre-process/post-process and the seeking, reading, or writing process, the invention also can be applied to other drive controls without being limited to such a process. For example, the invention also can be applied to a speed control of the spindle motor 125 in FIG. 2A. An FG signal which generates a predetermined number of pulses for a period of time of one rotation of the disk is supplied from the spindle motor 125 to the I/O control unit 111 and a signal to control a rotational speed is supplied from the I/O control unit 111 to the spindle motor 125. As an FG signal, 16 pulses are generated when the disk rotates once. The CPU 104 calculates the present speed by measuring the interval between the FG pulses from the spindle motor 125 so as to rotate the magnetooptic disk 103 at a speed of, for instance, 3600 r.p.m. The CPU 104 corrects the rotational speed and checks an abnormal rotation by a rotational speed control signal on the basis of the result of the calculation about the present speed. The FG signal is inputted to the CPU 104 through the I/O control unit 111. The value of a timer 3 (not shown) in the CPU 104 is latched in response to a leading edge of the FG signal. The FG pulse time interval can be measured. In this instance, an interruption occurs in the CPU 104 and the rotational speed is corrected and the abnormal rotation is checked by the interrupting process. Permission/inhibition timings of the interrupting process are substantially the same as those of the APC interrupting process.

Although the magnetooptic disk apparatus has been used in the embodiment, it is also possible to use another secondary memory apparatus for executing the command process and servo process from the host computer by the same CPU. For example, a hard disk apparatus, a magnetic tape apparatus, a CD-ROM apparatus, or the like also can be used. Although the SCSI has been used as an interface with the host computer in the embodiment, another interface such as IDE (Integrated Drive Electronics), IPI (Intelligent Peripheral Interface), or the like also can be used.

The detailed error check and simple error check will now be described.

In the detailed error check, the focusing error signal and tracking error signal extracted from the A/D converters 113 at every sampling of 50 kHz (every 20 μsec) are compared with a preset error level range. When those error signals exceed the level range for a predetermined time (predetermined number of sampling times), it is judged that an error has occurred.

For example, the error level range in this instance is set to the level corresponding to ±0.15 μm in the case of the tracking error and to the level corresponding to ±1 μm in the case of the focusing error. The above predetermined time is set to a sufficiently short time such that the head doesn't reach the adjacent track due to a tracking deviation or focusing deviation of about 100 μsec (5-sampling times). In the detailed error check, since the error check is performed once every sampling period, the error check can be executed in almost a real-time manner. However, the time to interrupt another process increases.

On the other hand, in the case of the simple error check, instead of performing the error check for every sampling of 50 kHz, the focusing error signal and tracking error signal accessed from the A/D converters 113 are compared with the preset error level range, for instance, once per two sampling periods (40 μsec). When those error signals exceed the level range for a predetermined time, it is judged that the error has occurred.

In this case, the error level and the predetermined time are set in a manner similar to those of the detailed error check.

In the simple error check, since it is not executed every sampling period, although the real-time performance is lost, the time to interrupt another process can be reduced.

As another simple error check, it is also possible to operate in a manner such that a signal (not shown) indicative of the total light amount of the sensor is accessed from the A/D converter once per a few sampling periods and is compared with a predetermined error level and, when the error level is equal to or lower than the predetermined error level for a predetermined time, it is judged that the error occurred.

The error level in this case is set to, for example, a value between the total signal on a groove and the total signal level when the head is completely out of focus. The predetermined time is set to a time longer than the time for judging the focusing error and tracking error.

With the above construction, since the error check is performed once per a few sampling periods, although the real-time performance deteriorates, the time to interrupt another process can be further reduced.

It is sufficient to switch such two kinds of error checks in accordance with the servo mode. In the mode for erasing, recording, or reproducing in which the errors need to be processed in a real-time manner, for example, the detailed error check is performed. In the wait mode in which it is sufficient that a state out of the servo can be detected, the simple error check is executed. In this way, those two kinds of error checks are switched and used.

The simplification of the arithmetic operation will now be described.

Figure 6:
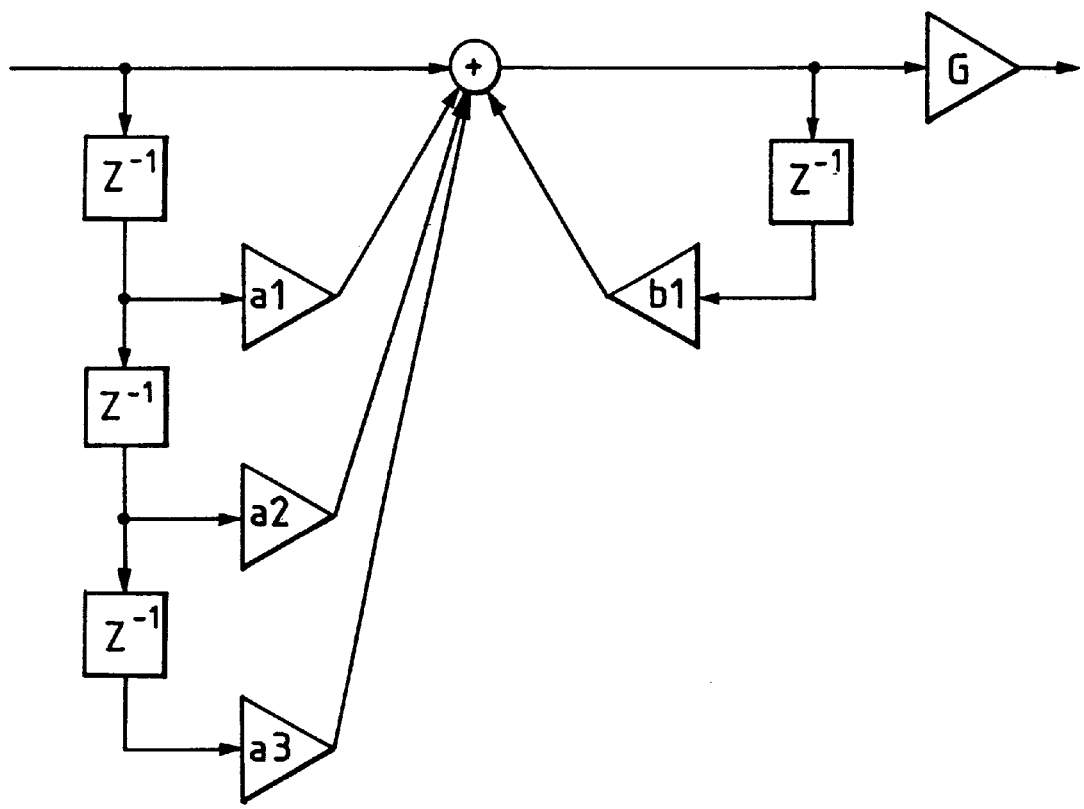
FIG. 6 is a diagram for explaining a cubic filter.

In the ordinary servo state, the operation is controlled by using the cubic filter. A block diagram for such an arithmetic operation is as shown in FIG. 6, for example. In FIG. 6, $Z^{-1}$ denotes a delay element and shows data which is delayed by one sampling period. Parts shown by a1, a2, a3, b1, and G correspond to multipliers. The actual arithmetic operations are executed by a method whereby the tracking error signals of three sampling periods before which were accessed from the A/D converter are stored on a scale, a1 is multiplied to the value of one sampling period before, the present value is added to the resultant value, a2 is multiplied to the value of two sampling periods before, the resultant value is added to the answer of the above addition, a3 is multiplied to the value of three sampling periods before, the resultant value is added to the answer of the above addition, b1 is multiplied to the value of one sampling period before the total addition output, the resultant value is added to the answer of the above addition, and a servo gain G is multiplied to the addition value. The answer is outputted to the D/A converter.

Figure 7:
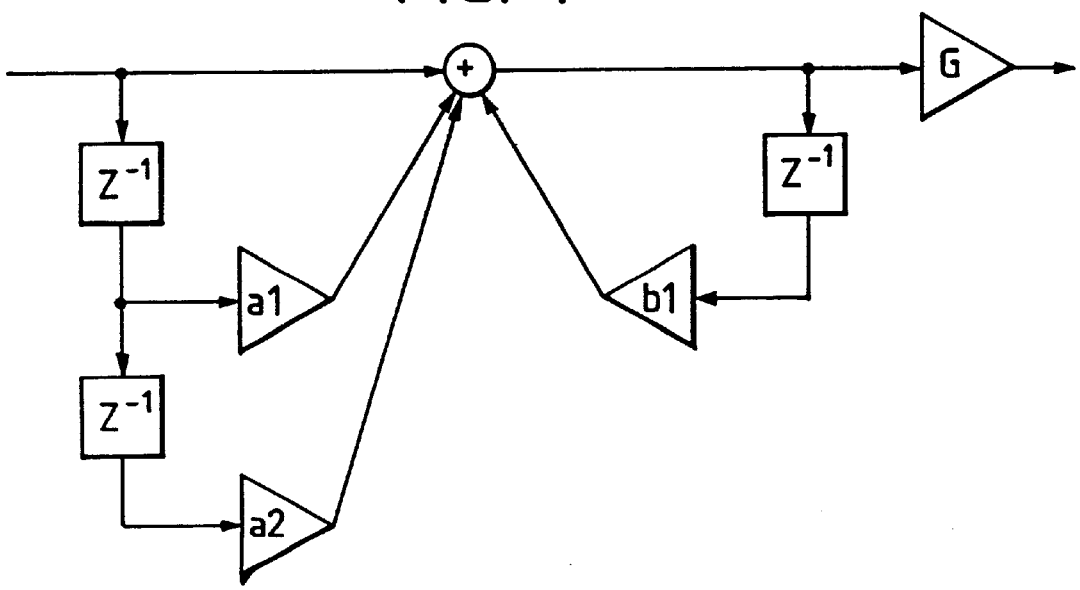
FIG. 7 is a diagram for explaining a quadratic filter.

In the arithmetic operation of the filter, the foregoing product sum arithmetic operation takes a long time and even one product sum arithmetic operation occupies a few % of one sampling time. Such an arithmetic operation is executed every sampling of 50 kHz (20 μsec) in the filter of the focusing servo. By reducing the number of times of the product sum arithmetic operation, the arithmetic operating time can be reduced. For example, in the cubic filter in FIG. 6, the product sum arithmetic operation of four times and the multiplication of one time are executed. In the quadratic filter in FIG. 7, the product sum arithmetic operation of three times and the multiplication of one time are executed.

However, in the case when the target servo characteristics can be realized by only the cubic filter, the degree number cannot be reduced. Therefore, for example, the cubic filter (FIG. 6) is used in the erase, reproduce, or record mode which need severe servo characteristics and the quadratic filter (FIG. 7) is used in the wait mode which doesn't require such severe servo characteristics. In this way, the number of multiplying times is reduced as a whole and the time to interrupt another process can be decreased.

In the first embodiment according to the invention as mentioned above, the time required for various kinds of drive control during the command pre-process/post-process is reduced by changing the precision of the servo process (changing the sampling frequency, arithmetic operating filter, and error check) or inhibiting the interrupt laser APC or the interrupt spindle velocity control. Thus, the time which is allocated to the command pre-process/post-process per unit time can be increased and the command pre-process/post-process can be executed at a high speed. Namely, the command pre-process/post-process time can be reduced. For this reason, the command execution time can be reduced.

Second Embodiment

Figure 8:
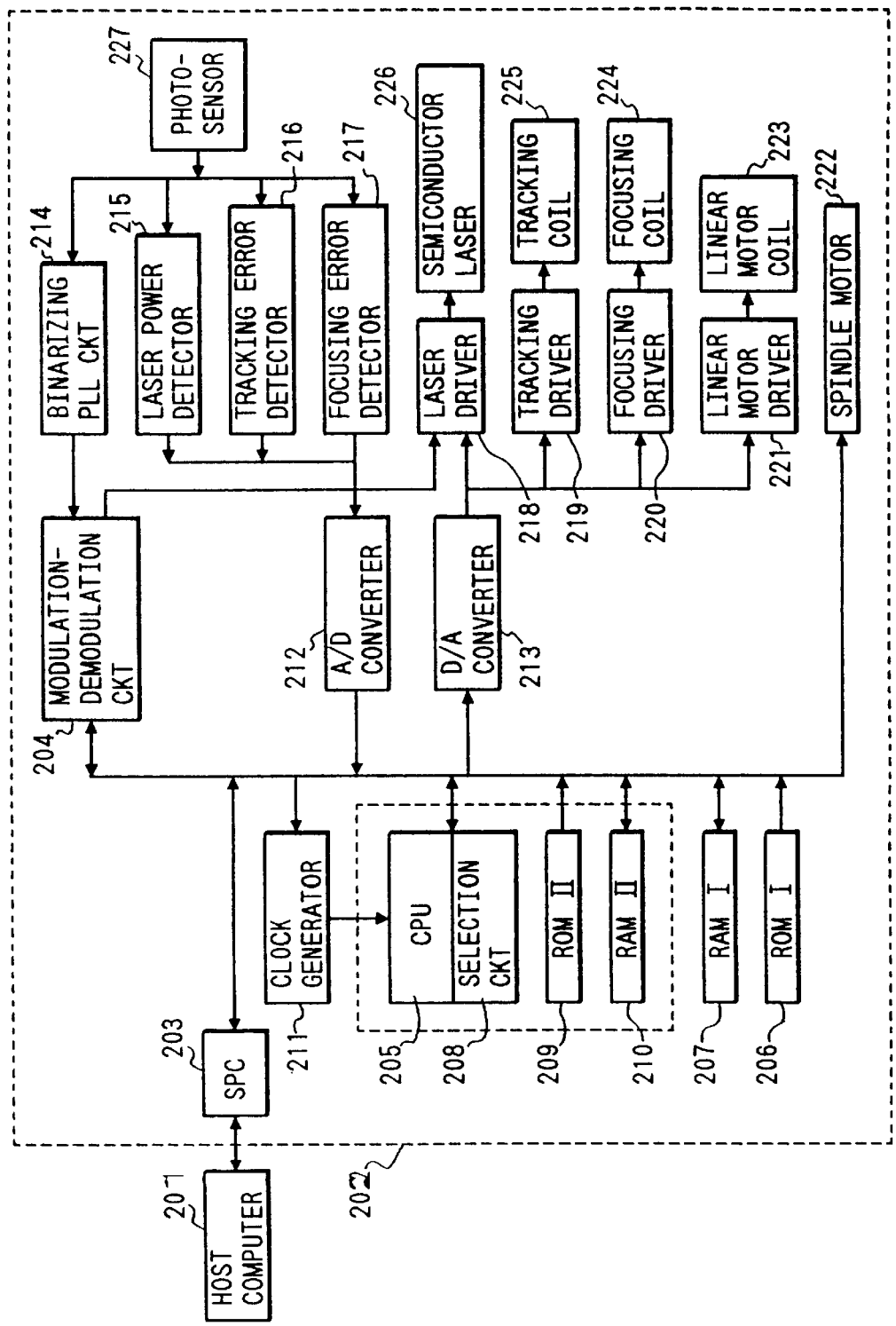
FIG. 8 is a block diagram showing a construction according to the second embodiment of the invention.

The second embodiment of the invention will now be described in detail hereinafter with reference to the drawings. FIG. 8 shows a block diagram of an information recording and/or reproducing apparatus according to the invention.

In FIG. 8, a host computer 201 and an optical disk drive apparatus 202 are connected by the SCSI interface.

An SPC 203 is arranged in the optical disk drive apparatus 202 and is an SCSI interface circuit for transmitting and receiving a read/write command from the host computer 201 and data such as a response or the like for such a command.

A CPU 205 is a control circuit of the whole drive for controlling in a manner such that a command from the host computer 201 is interpreted, data from the SPC 203 is transferred to a modulation-demodulation circuit 204, a light spot is accurately tracked to a target track, the light spot is focused (focusing), or the light spot is moved (sought) to the target track.

A ROM II 209 is a ROM in which servo microcodes and calculation data for allowing the CPU 205 to execute the tracking, focusing, seeking, and the like have been recorded.

A RAM II 210 is a RAM for servo in which data which is used for arithmetic operations for tracking, focusing, and seeking has been stored.

A ROM I 206 is a ROM in which microcodes and calculation data for executing the switching of the servo process by the data transfer between the CPU 205 and the SPC 203, the data transfer with the modulation-demodulation circuit 204, or the command from the host computer 201 have been recorded.

A RAM I 207 is a RAM in which data indicative of a mode status and command information from the host computer have been recorded.

Since the CPU 205, a selection circuit 208, the ROM II 209, and the RAM II 210 are formed on the same semiconductor chip, the accessing operation can be performed at a higher speed than the RAM I 207 and ROM I 206.

Figure 9:
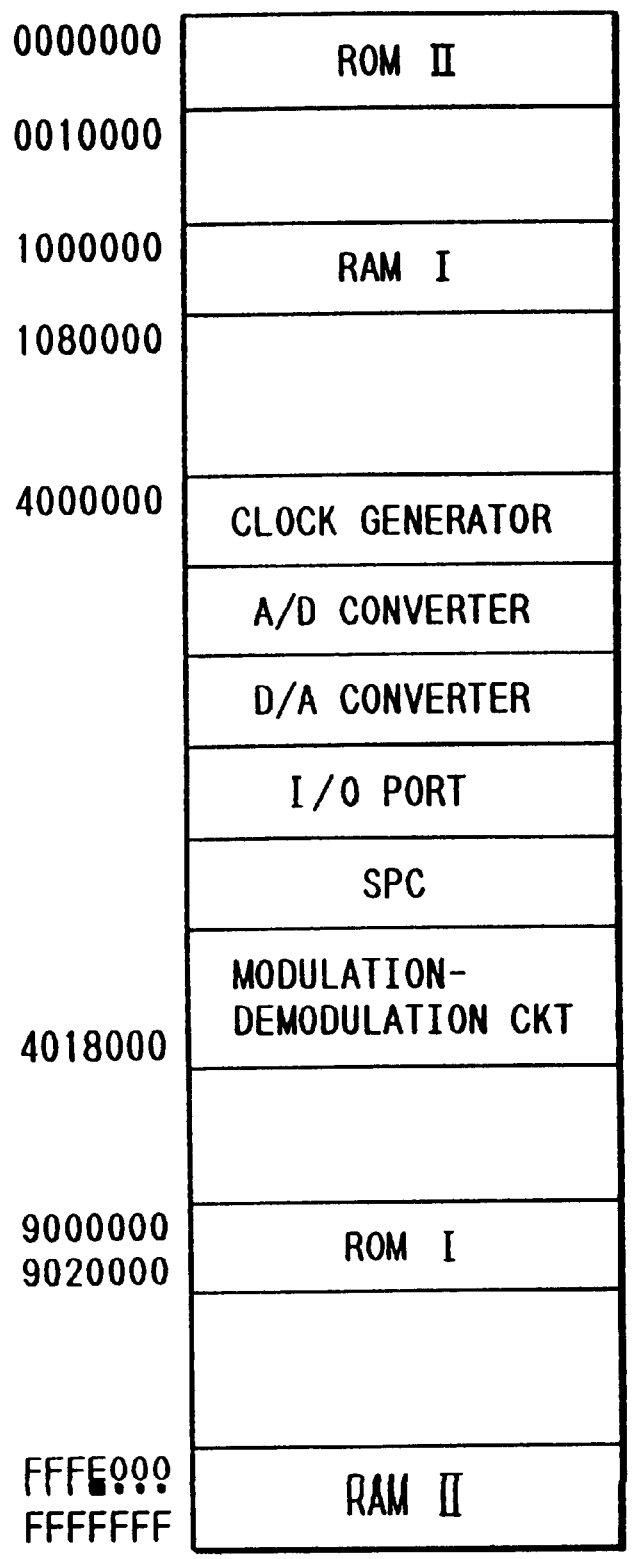
FIG. 9 shows a memory map of a memory according to the second embodiment of the invention.

FIG. 9 is an address map which is accessed by the CPU 205.

Addresses from 0000000 to 000FFFF are allocated to the ROM II 209. Addresses from 1000000 to 107FFFF are allocated to the RAM I 207. Addresses from 4000000 to 4017FFF are allocated to the operation sequence and the like of the SPC 203, modulation-demodulation circuit 204, clock generator 211, A/D converter 212, D/A converter 213, I/O port (not shown), and the like.

Addresses from 9000000 to 901FFFF are allocated to the ROM I 206. Addresses from FFFE000 to FFFFFFF are allocated to the RAM II 210.

The selection circuit 208 is a circuit for switching whether the CPU 205 selects the servo process or selects the command process such as a data transfer or the like with the SPC 203 and modulation-demodulation circuit 204 after completion of the servo interruption by a servo interruption signal from the clock generator 211. The selection circuit 208 time-divisionally selects the servo process and command process.

An electric signal detected from a photosensor 227 is converted to a signal indicative of the value of the laser power by a laser power detector 215.

The signal from the photosensor 227 is converted as a signal indicative of a deviation of the light spot in the tracking direction by a tracking error detector 216 and is converted to a signal indicative of a focusing deviation of the light spot by a focusing error detector 217.

Those signals are converted to the digital signals by an A/D converter 212 and, after that, they are inputted to the CPU 205.

The clock generator 211 is a circuit which can generate clock pulses of, for example, 50 kHz, 40 kHz, and 30 kHz. A frequency of the clock pulse is set by the CPU 205.

An interruption is periodically performed to the CPU 205 at the timing of the trailing edge of the clock pulse. By the interruption signal, the selection circuit 208 switches so that the CPU 205 executes a servo program of the ROM II 209. The CPU 205 executes a servo process for positioning the light spot to the target track. After completion of the servo process, the selection circuit 208 switches the CPU 205 so that a system program (command process) of the ROM I 206 is made operative, so that the CPU 205 subsequently executes the program before the interruption.

The clock pulse is also inputted to the A/D converter 212 and becomes a pulse to start the A/D conversion as a sampling clock.

As the sampling frequency is high, namely, as the number of sampling points is large, for example, the ratio of the servo processing time increases and the servo processing performance rises. However, the time for the command process such as data input and output with the host computer 201 or the like increases. In the opposite case, although the command processing time is short, the servo performance deteriorates.

The executing process when the CPU 205 receives a read command from the host computer will now be described. First, a state indicating that the apparatus is in the wait mode is set into an address indicative of the mode state in the RAM II 210. The clock generator 211 is set to 30 kHz. The apparatus subsequently waits for the input of the command from the host computer 201. When the command comes, an SCSI command is inputted from the SPC 203 and the command is analyzed. When the command is the read command, the target address is calculated. Subsequently, a state indicating that the apparatus is seeking is set into the address indicative of the mode state in the RAM II 210 by the CPU 205. Then, the clock generator 211 is set at 30 kHz.

After that, the CPU 205 allows current to flow in a tracking coil 225 and a linear motor coil 223 during the seeking operation and calculates the number of tracks which the head jumps, thereby moving the light spot to the target track. After the light spot reaches the target track, the CPU 205 records a state indicating that the data is being read to the address indicative of the mode state in the RAM II 210. The clock generator 211 is set to 40 kHz.

The reflection light modulated by a pit recorded on the track is reproduced as an electric signal by the photosensor 227.

The reproduced signal becomes a digital signal by a binarization PLL circuit 214 and is converted to the data of a host computer format by the modulation-demodulation circuit 204. In this instance, the erroneous data is corrected to accurate data.

After completion of the reading operation to read the data from the optical disk, a state indicating that the apparatus is in the wait mode is recorded in the address indicative of the mode state. The clock generator 211 is set to 30 kHz. The waiting operation is executed.

Figure 10:
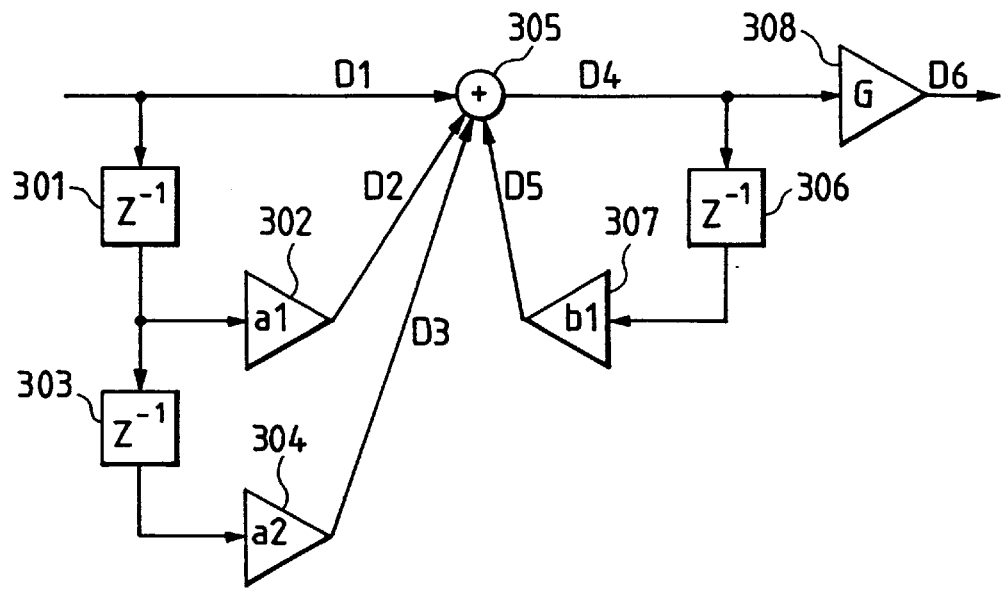
FIG. 10 is a circuit diagram of a quadratic filter according to the second embodiment of the invention.

FIG. 10 is a circuit diagram of what is called a quadratic filter arithmetic operation which is used in the focusing arithmetic operation process during the seek and the focusing arithmetic operation process and tracking arithmetic operating process during the read/wait mode which are executed by the CPU 205. Reference numerals 301, 303, and 306 denote delay units each having a delay time of one clock; 302, 304, and 307 coefficient units; 305 an adder; and 308 an amplifier.

The CPU 205 time-divisionally accesses the data of the A/D converter 212 from the focusing error detector 217 and tracking error detector 216. The CPU 205 adds a value D2 obtained by multiplying a1 to the one-preceding data and a value D3 obtained by multiplying a2 to the two-preceding data to present data D1, thereby obtaining data D4.

Data D5 obtained by multiplying b1 to the preceding data D4 is added to the data D4. Data D6 obtained by multiplying the gain (G) to the resultant addition data is outputted to a D/A converter 213. By the above arithmetic operation, for example, in the case of constructing a tracking servo loop, a filter arithmetic operation according to a predetermined phase error is executed from the tracking error signal level in accordance with the circuit diagram (FIG. 10). The resultant output is amplified by a tracking driver 219 and the tracking coil 225 is driven. The light spot on the optical disk is controlled so as to minimize a tracking deviation in the direction parallel with the disk surface.

Figure 12:
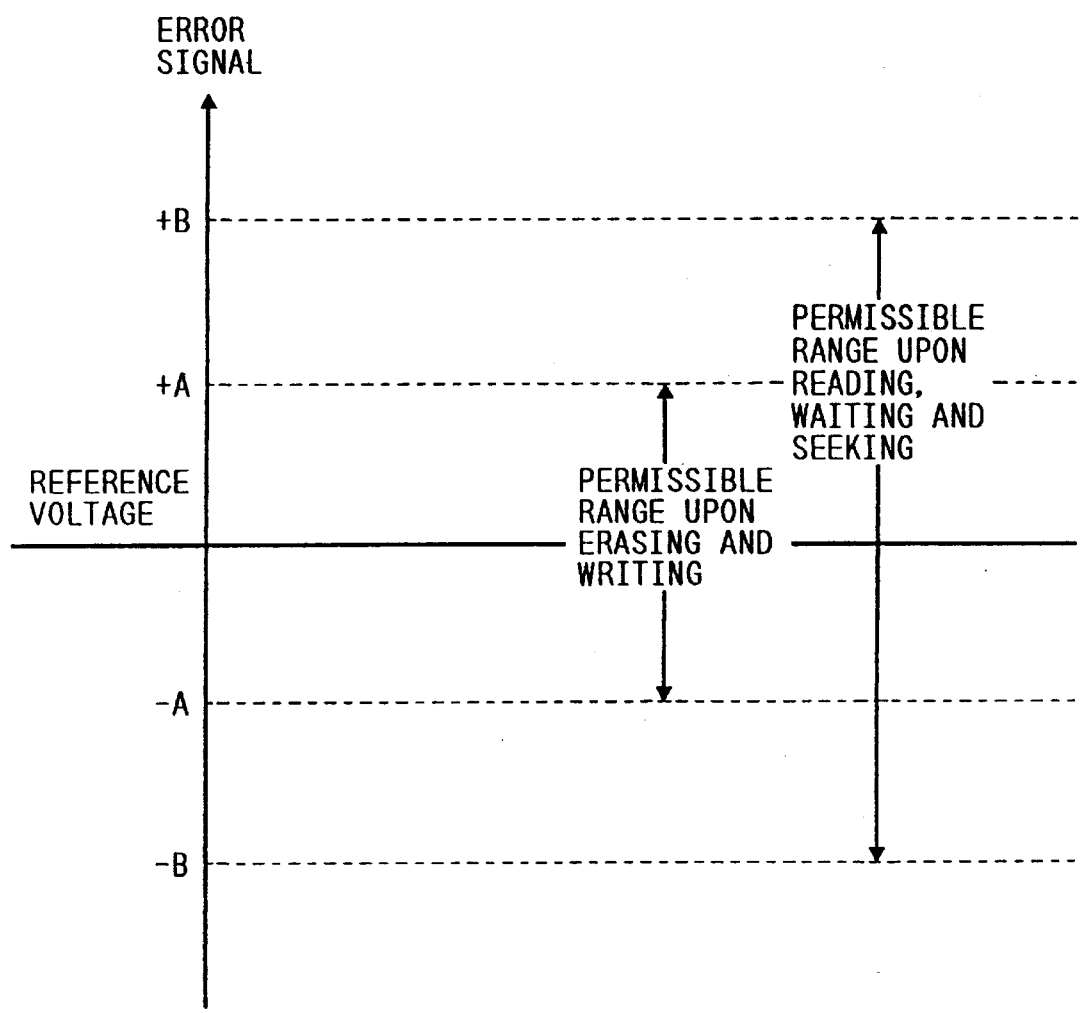
FIG. 12 is a graph for explaining a permissible range of an error signal for every mode according to the second embodiment of the invention.

FIG. 12 shows a range in which the focusing error signal and tracking error signal are permitted from a reference level. When the focusing error signal and tracking error signal lie within a range of the reference voltage ±A, they lie within the permissible range of the erase/write mode. When the error signals lie within a range of the reference voltage ±B, this means that the mode state lies within the permissible range upon reading, waiting, or seeking.

Figure 13:
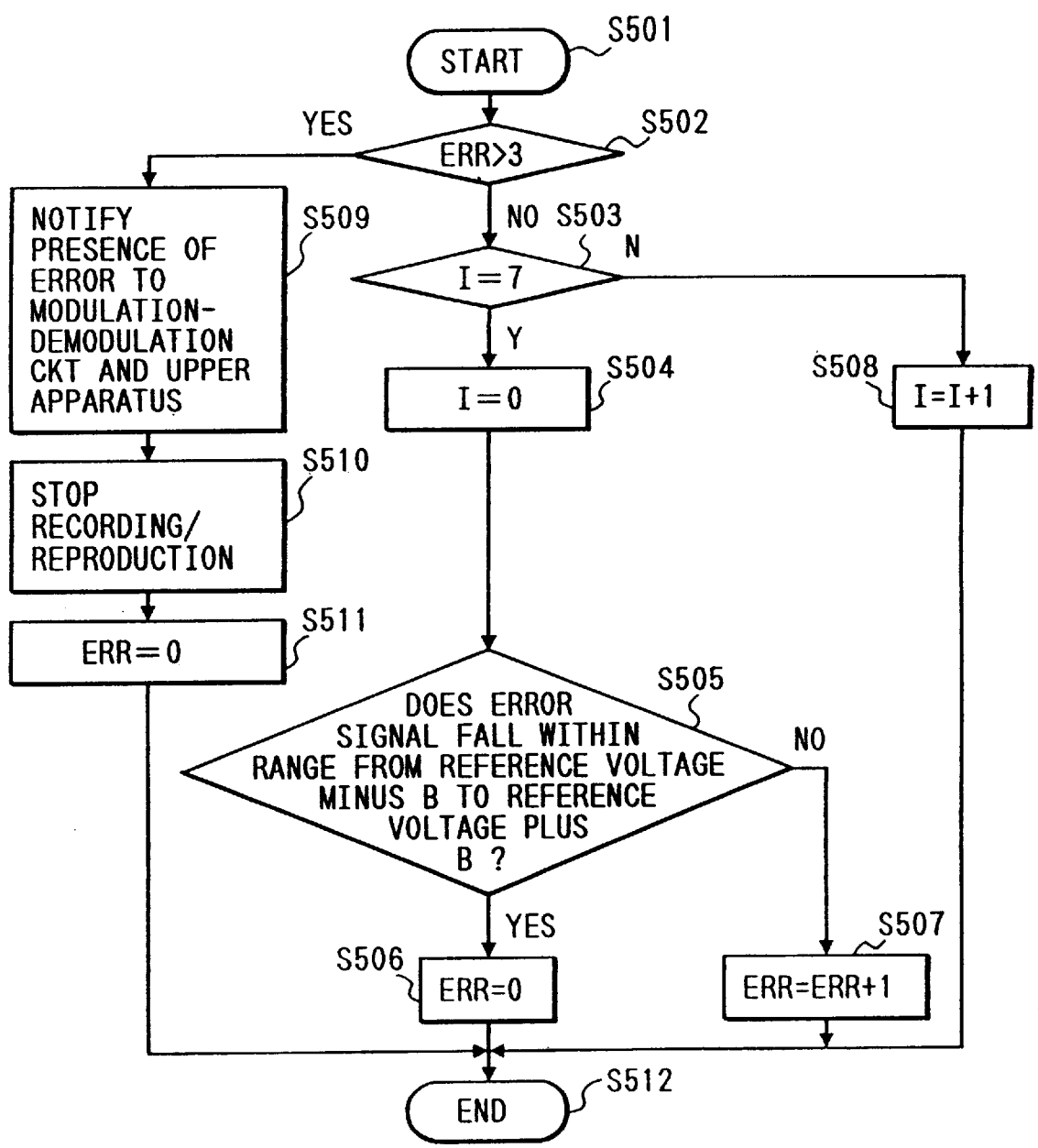
FIG. 13 is a flowchart for an error process according to the second embodiment.

FIG. 13 is a flowchart for the focusing error detection in the seek mode and the focusing detection and tracking error detection in the read or wait mode.

The flowchart is activated every sampling clock in the seek mode or the read or wait mode. "0" is set as an initial value into a number (I) of sampling times and a number (ERR) of times at which the tracking error signal and focusing error signal exceed the reference voltage (S501).

First, a check is made to see if the value of ERR is equal to or larger than 3 or not (step S502). After that, the value of (I) is compared with 7 (S503). When the value of (I) is not equal to 7, "1" is added to the value of (I) (S508) and the processing routine is finished (S512). When the value of (I) is equal to 7, it is cleared to 0 (S504). A check is made to see if the error signal lies within a range of the reference voltage ±B or not (S505). As mentioned above, the error check is performed once per eight sampling clocks.

When the error signals exceed the range of the reference voltage ±B, "1" is added to the value of ERR (S507) and the processing routine is finished.

When the error signals don't exceed the range of the reference voltage ±B, even if the value of ERR has been set, it is cleared to 0 (S506). Even if the error signals are temporarily oscillated due to noises or a slight scratch, dust, or the like on the medium, the occurrence of the error is not notified.

When the value of ERR is equal to or larger than 3, this means that 24 or more sample clocks are generated after the detection of the error. The occurrence of error is notified to the modulation-demodulation circuit 204 and the host computer (S509). The data reproduction is stopped (S510). The value of ERR is set to 0 (S511). The processing routine is finished.

The above flowchart has been shown with respect to the case in which when the error signal is generated three or more times within a period of time of 24 sampling clocks, the occurrence of error is notified to the upper apparatus and the optical disk drive apparatus is stopped. However, those numbers are merely shown as an example and also can be changed to proper values in accordance with a degree of burden on the CPU 203.

When a command to record the data is subsequently sent from the host computer 201 in the wait mode, the CPU 205 sets a state indicating that the seeking operation is being performed into the address indicative of the mode in the RAM II 210. The clock generator 211 is set at 30 kHz in this instance.

A current is supplied to the tracking coil 223, thereby moving the light spot to the target track. The arrival at the target track is known by the modulation-demodulation circuit 204.

After that, a state indicating that the erasing operation is performed is set into the address indicative of the mode. The clock generator 211 is set to 50 kHz.

The data is set into the D/A converter 213 so as to turn on the laser by an erase power, thereby erasing the data which has already been recorded.

After completion of the erasure, a state indicating that the writing operation is being performed is recorded in the address indicative of the mode. The clock generator 211 is set to 50 kHz.

The recording data sent from the host computer 201 passes through the CPU 205 and is transferred to the modulation-demodulation circuit 204 and is converted to the pit data for recording to the optical disk.

The CPU 205 sets a laser write power into the D/A converter 213. A write power signal from the D/A converter 213 is inputted to a laser driver 218 together with the recording pit data of the modulation-demodulation circuit 204 and is synthesized thereto. The synthesized data is amplified and becomes the optical data of the laser beam for irradiation by a semiconductor laser 226. The laser beam is irradiated to the optical disk and is recorded as a recording pit.

After completion of the recording, the CPU 205 notifies the end of recording to the host computer, reduces the laser power to a read power, records a state indicating that the apparatus is in the wait mode into the address indicative of the mode in the RAM II 210, and sets the clock generator 211 to 30 kHz.

Until the next command is sent from the host computer 201, the light spot jumps the track once per rotation of the disk and is maintained at a point located on the same track. The apparatus is set into the wait mode.

Figure 11:
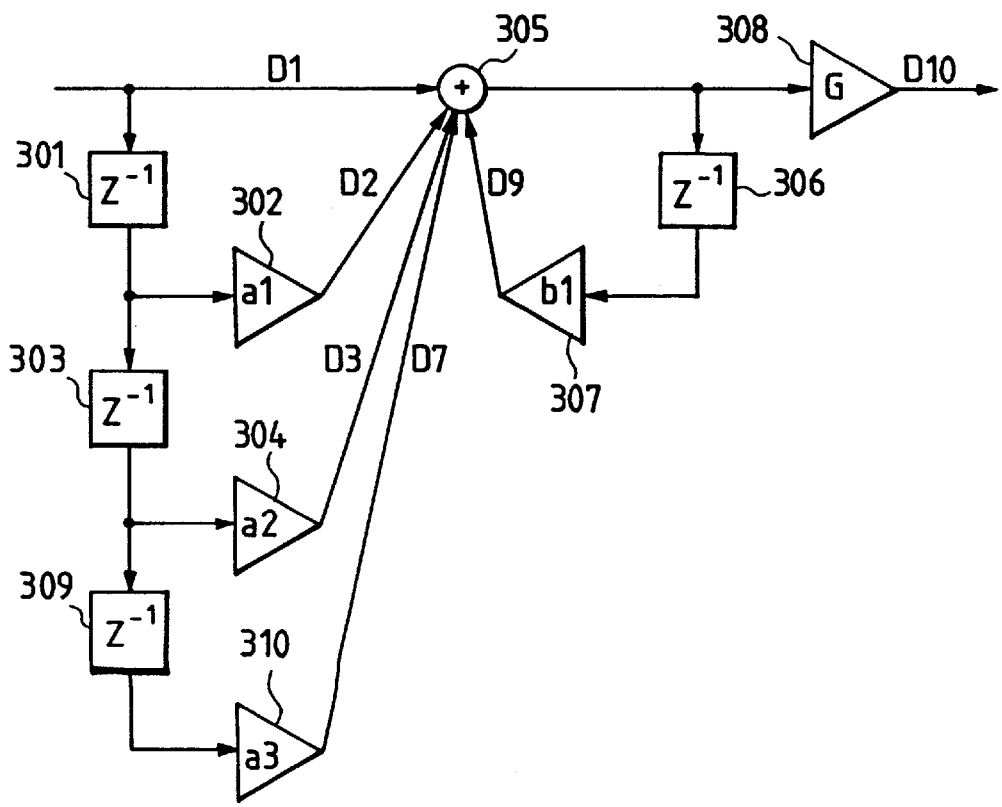
FIG. 11 is a circuit diagram of a cubic filter according to the second embodiment of the invention.

FIG. 11 shows a cubic filter arithmetic operation of the focusing arithmetic operating process and the tracking arithmetic operating process which are executed by the CPU 205 in the erase/write mode. In a manner similar to FIG. 10, the data from the A/D converter 212 is inputted and its output is supplied to the D/A converter 213. The constant G indicates the gain of the servo loop and is set to a value larger than the gain G in FIG. 10. Reference numeral 309 denotes a delay unit and 310 indicates a coefficient unit.

By the quadratic filter arithmetic operation which is executed in the seek/read/wait mode in FIG. 10, a3 is multiplied to the total three-preceding data that is further one-preceding to the two-preceding data (D7). The resultant data is added by the adder 305, so that a fine control can be performed.

However, since the number of product sum arithmetic operations is larger than that of the quadratic filter, it takes a long arithmetic operating time. Eventually, the time for the command process such as data transfer with the host computer 201 or the like increases. Therefore, the arithmetic operating processes are executed by the circuit arithmetic operation of FIG. 10 in the seek/read/wait mode and are performed by the circuit arithmetic operation of FIG. 11 in the erase/write mode.

Therefore, an importance is paid to the time during the reading operation and an importance is paid to the control precision during the writing operation.

The permissible range in the erase/write mode in FIG. 12 is set to the reference voltage ±A (A<B) and is narrower than the permissible range of the read/wait/seek mode.

Figure 14:
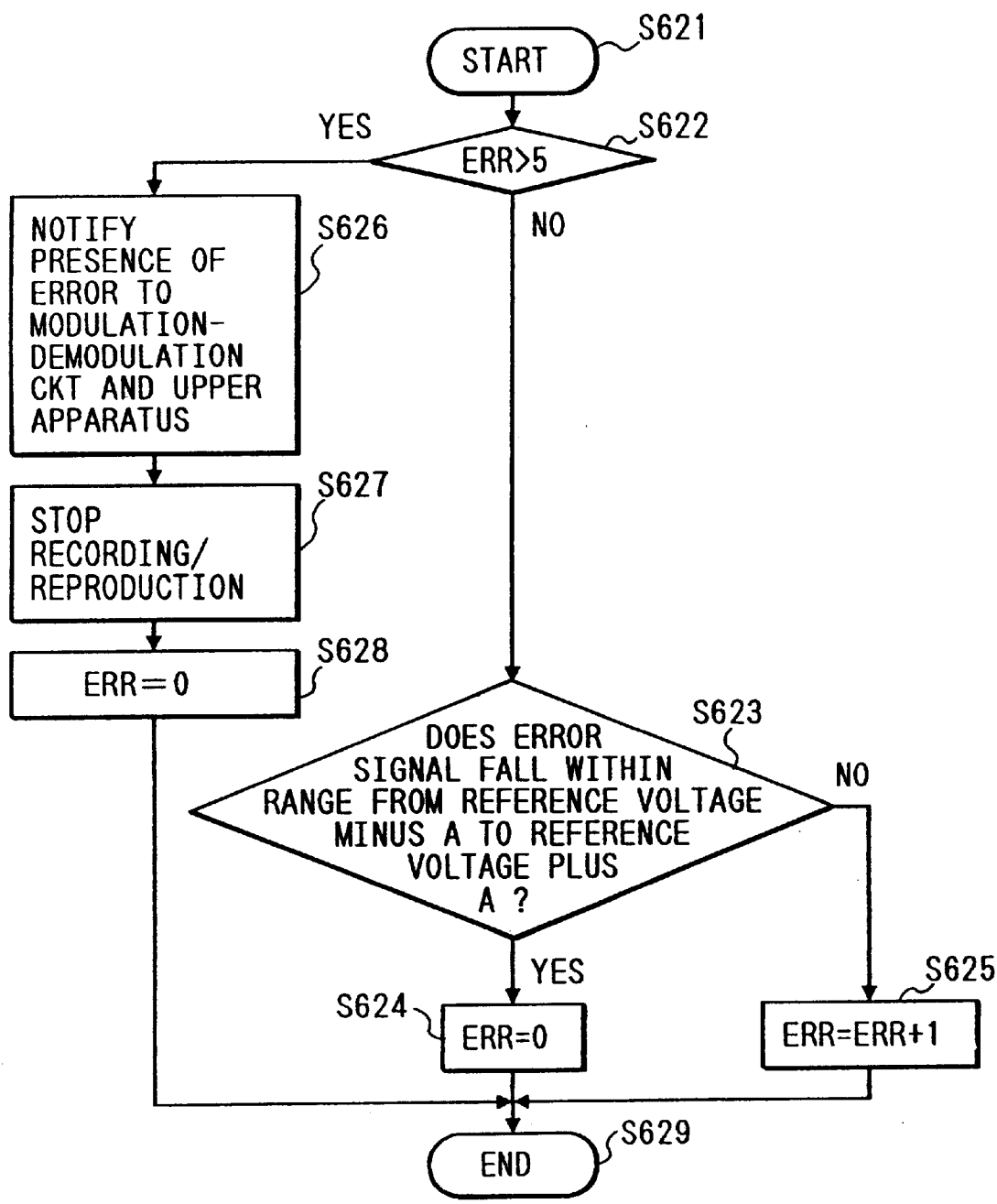
FIG. 14 is a flowchart for an error process according to the second embodiment of the invention.

FIG. 14 is a flowchart for a program to judge with respect to the focusing detection, tracking detection, and error detection which are executed by the CPU 205 in the erase/write mode. The flowchart is activated every servo sampling clock in the erase/write mode. "0" is substituted as an initial value into the number of times ERR at which each error signal exceeds the reference voltage (S621).

First, a check is made to see if the value of ERR is equal to or larger than 5 or not (S622). After that, a check is made to see if the error signals lie within the range of the reference voltage ±A or not (S623). In the case of the read/wait/seek mode in FIG. 13, whether the error signals exceed the reference voltage or not has been judged at a rate of once per eight servo sampling clocks. However, in the case of the erase/write mode, such a judgment is executed every servo sampling clock.

When the error signals exceed the reference range, "1" is added to ERR (S625). When the error signals lie within the reference range, even if the value of ERR has been set, it is cleared to 0 (S624).

In the case when the value of ERR has been continuously added and has been set to a value of 5 or more (also including the case when after the error was detected, five or more servo sampling clocks are generated), the occurrence of the error is notified to the host computer 201 through the modulation-demodulation circuit 204, thereby stopping the recording and reproducing functions of the optical disk drive apparatus 202.

Although the occurrence of the error has been notified when 24 sampling clocks were generated in the read/wait/seek mode in FIG. 13, in the case of the erase/write mode, as shown in the flowchart, in order to accurately record the data and in order not to erase the data of the adjacent tracks, the occurrence of the error is judged in a short time.

Third Embodiment

Figure 15:
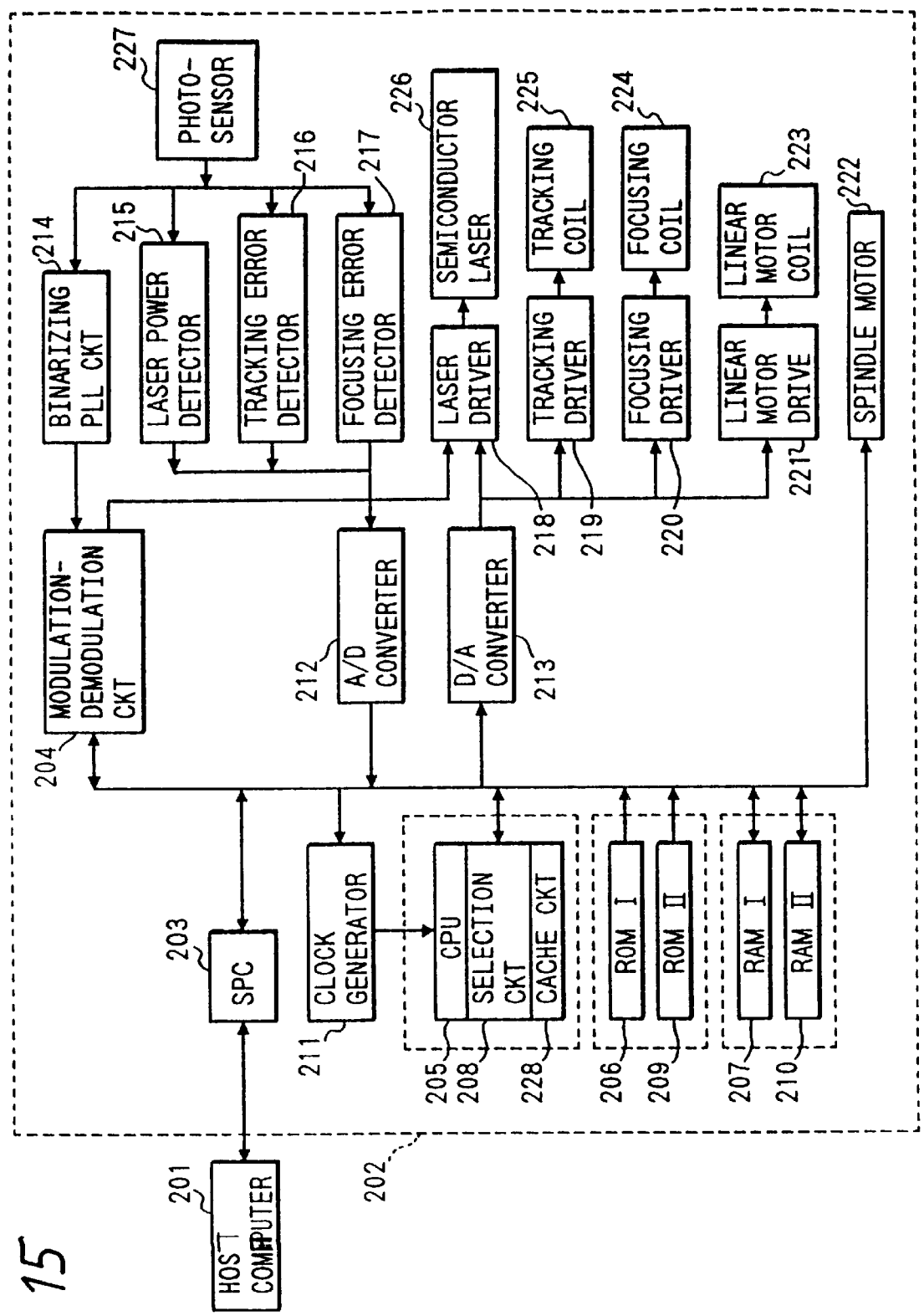
FIG. 15 is a block diagram of a construction according to the third embodiment of the invention.

The third embodiment of the invention will now be described hereinafter in detail with reference to the drawings. FIG. 15 shows a block diagram of an information recording and/or reproducing apparatus according to the invention. The portions having conceptually the same functions as those in FIG. 8 are designated by the same reference numerals and their descriptions are omitted here.

A construction of FIG. 15 differs from that of FIG. 8 with respect to a point that a cache circuit 228 is provided.

The cache circuit 228 is a circuit such that the reading and writing operations of the data of all of the ROM I 206, ROM II 209, RAM I 207, and RAM II 210 are executed in a lump and, when the CPU 205 accesses the read address, by accessing the data in the cache, the data can be processed at a high speed.

The CPU 205, selection circuit 208, and cache circuit 228 are constructed on the same semiconductor chip. The RAM I 207 and RAM II 210 are likewise constructed on the same semiconductor chip. Further, the ROM I 206 and ROM II 209 are also constructed on the same semiconductor chip. However, the accessing operation can be executed at a high speed by the cache circuit 228.

Figure 16:
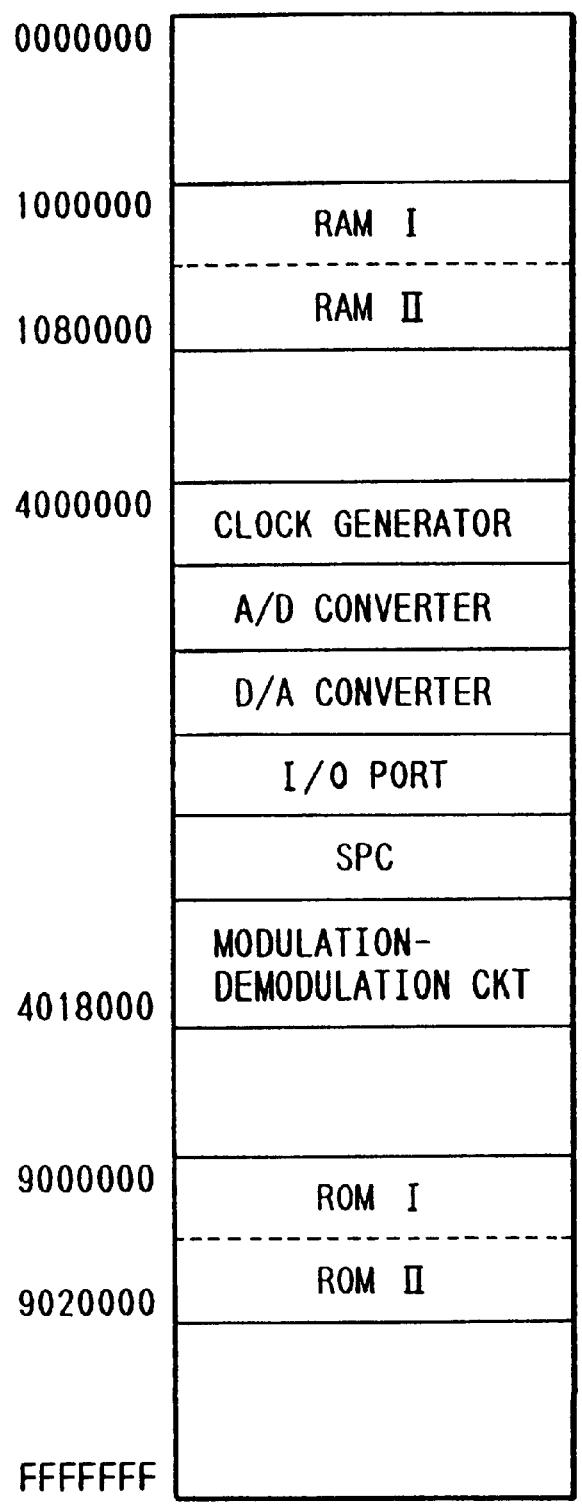
FIG. 16 is a memory map of a memory according to the third embodiment of the invention.

FIG. 16 is an address map which is accessed by the CPU 205 in FIG. 15.

First, the RAM I 207 and RAM II 210 are allocated to the addresses from 1000000 to 1080000. The operating sequence and the like of the clock generator 211, A/D converters 212, D/A converters 213, I/O port (not shown), SPC 203, modulation-demodulation circuit 204, and the like are allocated to the addresses from 4000000 to 4018000.

The ROM I 206 and ROM II 209 are allocated to the addresses from 9000000 to 9020000. As shown in the address map, there is no need to divide each of the RAM and the ROM into two memories and their addresses also can be mixedly used.

Ordinarily, an amount of dust or scratch on the disk to record data, an eccentricity amount of the disk, a vibration amount of the installing location of the optical disk drive apparatus, or the like is handled as external disturbance in the servo control process. The external disturbance amount is detected by the tracking error detector 216 and focusing error detector 217.

When the disk is loaded and a servo control process is activated, the external disturbance amount is measured and measurement data is recorded into the RAM II 210.

When the external disturbance amount is small, the clock generator 211 is set to 30 kHz and the error is detected about every 33 $\mu$sec. When a certain amount of external disturbance exists, the clock generator is set to 40 kHz. When the external disturbance amount is large, the clock generator is set to 50 kHz so as to frequently detect the error and the error is detected every 20 $\mu$sec.

When the external disturbance amount is small, the quadratic filter arithmetic operation in FIG. 10 is executed as a servo filter arithmetic operation. When the external disturbance amount is contrarily large, the cubic filter arithmetic operation in FIG. 11 is executed, thereby raising the precision. In this case, the gain constant G in FIGS. 10 and 11 shows the gain of the servo loop. When the external disturbance amount is large, the constant G is increased and the gain is set to a slightly high value. The error detecting sensitivity is raised as mentioned above. A recording pit of a higher accuracy is formed or the data of the accurate recording pit is read out.

Figure 17:
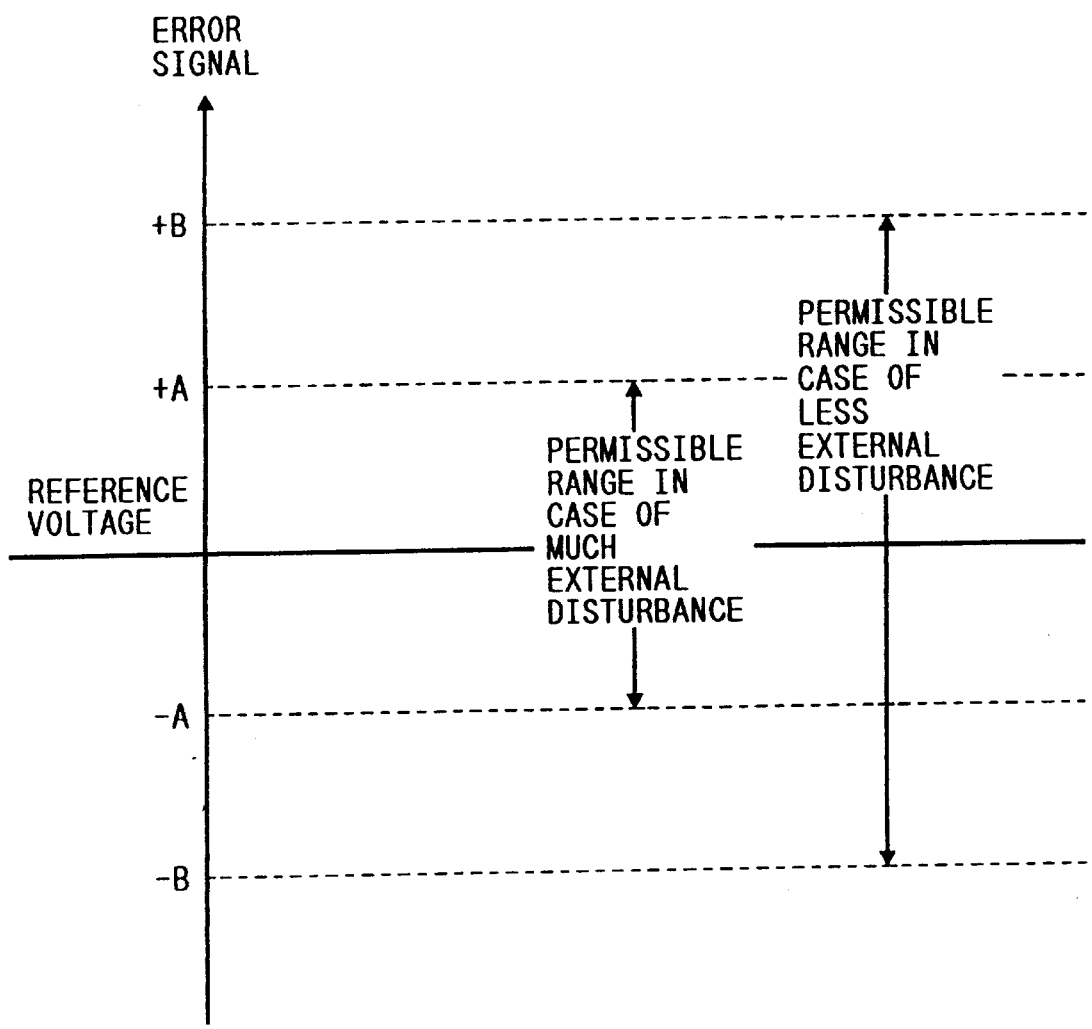
FIG. 17 is a graph for explaining a permissible range of an error signal for every mode according to the third embodiment of the invention.

When the external disturbance amount is small as shown in FIG. 17, the error detecting level is set by setting the permissible range for the reference voltage to a wide permissible range of the reference voltage ±B. When the external disturbance amount is large, the permissible range for the reference voltage is set to a narrow range of the reference voltage ±A. The frequency of the occurrence of errors is detected.

When the external disturbance amount is small, the program of FIG. 13 is used as a program for the error check which is activated by the clock generator 211 and a final judgment about whether the operation is stopped every 24 clocks or not is executed.

In the flowchart of FIG. 13, "0" is substituted as an initial value into the number of sampling times (I) and the number of times ERR at which the tracking error signal and focusing error signal exceed the reference value (S501).

First, a check is made to see if the value of ERR is equal to or larger than 3 or not (S502). After that, the value of (I) is compared with 7 (S503). When the value of (I) is not equal to 7, "1" is added to (I) (S508). The processing routine is finished (S512). When the value of (I) is equal to 7, (I) is cleared to 0 (S504). A check is made to see if the error signals lie within the range of the reference voltage ±B or not (S505). As mentioned above, the error check is performed once per eight sampling clocks.

When the error signals exceed the range of the reference voltage ±B, "1" is added to the value of ERR (S507). The processing routine is finished.

When the error signals don't exceed the range of the reference voltage ±B, even if the value of ERR has been set, it is cleared to 0 (S506). The external disturbance at a level such as noises or a slight scratch, dust, or the like on the medium which doesn't exert any influence on the recording and reproduction is ignored.

When the value of ERR is equal to or larger than 3, this means that the error signals are out of the reference range for a period of time when 24 sampling clocks are continuously generated after the error was detected. However, such a state is judged as an error and the occurrence of error is notified to the modulation-demodulation circuit 204 and the host computer (S509). The data reproduction is stopped (S510). The value of ERR is cleared to 0 (S511). The processing routine is finished.

In the flowchart, the case in which when the error signal is generated three or more times for a period of time of 24 sampling clocks, the occurrence of error is notified to the upper apparatus and the optical disk drive apparatus is stopped has been shown. However, those numbers are merely shown as an example and also can be changed to proper values in accordance with a degree of burden on the CPU 205.

On the other hand, when the external disturbance amount is large, the program shown in the flowchart of FIG. 14 is activated by the signal of the clock generator 211.

In FIG. 14, the discrimination regarding whether the error signals lie within the range of the reference voltage ±A or not (S623) is executed every clock. When the error signals are out of the range of the reference voltage ±A, "1" is added to the value of ERR.

In the case when the value of ERR has continuously been added and has been set to a value of 5 or more (such a case also includes a case in which five or more servo sampling clocks are generated after the error was detected), the occurrence of the error is notified to the host computer 201 through the modulation-demodulation circuit 204. The recording and reproducing functions of the optical disk driver apparatus 202 are stopped.

In the case of FIG. 13, the number of error checking times per unit time decreases to a value less than that in the case of FIG. 14 and the servo precision deteriorates. However, the system program for the data transfer or the like of the host computer 201 is operated at a high speed by a speed corresponding to such a deterioration of the servo precision.

On the contrary, in the case of FIG. 19, although the system program is operated at a low speed, the servo precision is improved. After the occurrence of the error is notified to the host computer 201, by increasing the external disturbance data recorded in the RAM II 210, the servo precision is improved for the next time, so that the frequency of the occurrence of errors can be decreased.

In this case, when no error occurs for a predetermined time, by reducing the external disturbance data in the RAM II 210, the system program is operated at a high speed for the next time.

According to the second and third embodiments of the invention as mentioned above, by changing the precision of the servo process (changing the sampling frequency, arithmetic operating filter, error check) in accordance with the external disturbance amount or operating mode, the command execution time can be shortened. That is, the command pre-processing/post-processing time can be reduced. Further, the data can be accurately recorded and reproduced at a high speed.

What is claimed is:

1. An information recording and reproducing apparatus for performing recording and/or reproduction of data onto/from a recording medium by irradiating a light beam emitted from a light source onto a desired track of the recording medium through an optical system, comprising:

a drive circuit for driving the light source;

a photosensor for receiving a portion of the light beam emitted from the light source to detect output power of the light source;

a memory for storing a target value of the output power of the light source; and a single processor for executing input/output control of the data and power control by interrupting the input/output control at predetermined time intervals, said processor comparing a detected value of said photosensor with the target value stored in said memory and controlling said drive circuit so that the detection value coincides with the target value, when said processor executes the power control.

2. An information recording and reproducing method for performing recording and/or reproduction of data onto/from a recording medium using an apparatus comprising a light source, an optical system irradiating a light beam emitted from the light source onto a desired track of the recording medium, a drive circuit driving the light source, a photosensor receiving a portion of the light beam emitted from the light source to detect output power of the light source, a memory storing a target value of the output power of the light source, and a single processor, the method comprising the steps of:

executing input/output control of the data for the apparatus by the processor; and executing power control by interrupting the input/output control at predetermined time intervals by the processor, said power control executing step comparing a detection value of the photosensor with the target value stored in the memory and controlling the drive circuit so that the detection value coincides with the target value.

* * * * *

UNITED STATES PATENT AND TRADEMARK OFFICE
CERTIFICATE OF CORRECTION

PATENT NO.    : 6,049,516

DATED         : April 11, 2000

INVENTOR(S)   : YUTAKA OGASAWARA, ET AL.

It is certified that error appears in the above-identified patent and that said Letters Patent is hereby corrected as shown below:

Column 6

Line 11, "value" should read --a value--.

Column 9

Line 10, "doesn't" should read --does not--.

UNITED STATES PATENT AND TRADEMARK OFFICE
CERTIFICATE OF CORRECTION

PATENT NO. : 6,049,516
DATED : April 11, 2000
INVENTOR(S) : YUTAKA OGASAWARA, ET AL.

It is certified that error appears in the above-identified patent and that said Letters Patent is hereby corrected as shown below:

Column 10

Line 27, "doesn't" should read --does not--.

Column 12

Line 52, "al" should read --a1--.

Signed and Sealed this

Seventeenth Day of April, 2001

Attest:

NICHOLAS P. GODICI

Attesting Officer     Acting Director of the United States Patent and Trademark Office